(12) United States Patent
Kinoshita et al.

(10) Patent No.: US 11,522,420 B2
(45) Date of Patent: Dec. 6, 2022

(54) METHOD OF PRODUCING MOTOR CORE

(71) Applicant: TOYOTA JIDOSHA KABUSHIKI KAISHA, Toyota (JP)

(72) Inventors: Akihito Kinoshita, Mishima (JP); Noritsugu Sakuma, Mishima (JP); Tetsuya Shoji, Susono (JP); Kosuke Yonekawa, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 369 days.

(21) Appl. No.: 16/811,811

(22) Filed: Mar. 6, 2020

(65) Prior Publication Data

US 2020/0303998 A1 Sep. 24, 2020

(30) Foreign Application Priority Data

Mar. 20, 2019 (JP) .............................. JP2019-053698

(51) Int. Cl.
| | |
|---|---|
| *H01F 1/057* | (2006.01) |
| *H01F 1/147* | (2006.01) |
| *H02K 15/03* | (2006.01) |
| *C22C 38/00* | (2006.01) |
| *H02K 1/02* | (2006.01) |
| *H05B 6/80* | (2006.01) |

(52) U.S. Cl.
CPC ........... *H02K 15/03* (2013.01); *C22C 38/005* (2013.01); *H01F 1/057* (2013.01); *H01F 1/147* (2013.01); *H02K 1/02* (2013.01); *H05B 6/80* (2013.01); *C22C 2202/02* (2013.01)

(58) Field of Classification Search
None
See application file for complete search history.

(56) References Cited

U.S. PATENT DOCUMENTS

| | | |
|---|---|---|
| 2009/0200885 A1 | 8/2009 | Kikuchi et al. |
| 2011/0012460 A1 | 1/2011 | Ozeki et al. |
| | (Continued) | |

FOREIGN PATENT DOCUMENTS

| | | |
|---|---|---|
| EP | 2533403 A1 | 12/2012 |
| JP | 2007273815 A | 10/2007 |
| | (Continued) | |

OTHER PUBLICATIONS

Machine translation of JP 2018-113333A. (Year: 2018).*

*Primary Examiner* — Xiaowei Su
(74) *Attorney, Agent, or Firm* — Dickinson Wright, PLLC

(57) ABSTRACT

A method of producing a motor core includes preparing a soft magnetic plate containing a transition metal element, preparing a modifying member containing an alloy having a melting point lower than a melting point of the soft magnetic plate, bringing the modifying member into contact with a part of a plate surface of the soft magnetic plate, causing the modifying member to diffuse and penetrate into the soft magnetic plate from a contact surface between the soft magnetic plate and the modifying member and forming a hard magnetic phase-containing part in a part of the soft magnetic plate, and laminating a plurality of soft magnetic plates on each other after the modifying member is brought into contact with the part of the plate surface of the soft magnetic plate.

21 Claims, 10 Drawing Sheets

(56) References Cited

U.S. PATENT DOCUMENTS

| | | | |
|---|---|---|---|
| 2013/0153088 A1* | 6/2013 | Dreikorn | H01F 41/005 427/127 |
| 2015/0000862 A1* | 1/2015 | Ohta | B22D 11/0611 164/463 |
| 2015/0357100 A1 | 12/2015 | Vano et al. | |
| 2016/0141083 A1 | 5/2016 | Ito et al. | |

FOREIGN PATENT DOCUMENTS

| | | |
|---|---|---|
| JP | 2009153356 A | 7/2009 |
| JP | 2012244649 A | 12/2012 |
| JP | 6007945 B2 | 10/2016 |
| JP | 2018-113333 A | 7/2018 |
| JP | 2018139305 A | 9/2018 |
| WO | 2014196605 A1 | 12/2014 |
| WO | 2016023961 A1 | 2/2016 |

\* cited by examiner

METHOD OF PRODUCING MOTOR CORE

INCORPORATION BY REFERENCE

The disclosure of Japanese Patent Application No. 2019-053698 filed on Mar. 20, 2019 including the specification, drawings and abstract is incorporated herein by reference in its entirety.

BACKGROUND

1. Technical Field

The present disclosure relates to a method of producing a motor core.

2. Description of Related Art

A motor includes a rotor and a stator that interacts with the rotor to generate a rotational moment. There are many types of motors, and accordingly, there are also many types of rotors and stators.

In Japanese Unexamined Patent Application Publication No. 2012-244649 (JP 2012-244649 A), a permanent magnet motor (PM motor), and particularly, an interior permanent magnet motor (IPM motor) is disclosed.

In the motor disclosed in JP 2012-244649 A, a motor core in which a conductor wire is wound around a soft magnetic plate laminate is used as a stator, and a motor core in which a permanent magnet is embedded into a soft magnetic plate laminate is used as a rotor.

In the motor disclosed in JP 2012-244649 A, a permanent magnet is embedded into a soft magnetic plate laminate, but a permanent magnet may be attached to the lamination side surface of the soft magnetic plate laminate depending on the type of motor. In addition, depending to the type of motor, a permanent magnet may be disposed in the stator. Thus, in the motor, various types of motor cores are prepared according to applications. Here, in order to support motor cores of various types, there are various types of permanent magnets.

Permanent magnets are broadly classified into bonded magnets and sintered magnets. These are classified according to methods of producing permanent magnets. A bonded magnet is produced by molding magnetic powder using a binder. For the binder, a resin or a low melting point metal (including a low melting point alloy), or the like is used. A sintered magnet is produced by pressure-less sintering or pressure sintering of magnetic powder. Regarding a method of producing a permanent magnet, in addition to these, there are various production methods. For example, in WO 2014/196605 and Japanese Patent No. 6007945, a method in which a rare earth element diffuses and penetrates into a soft magnetic material to produce a rare earth magnet and/or a nano composite magnet is disclosed.

SUMMARY

Both a bonded magnet and a sintered magnet are molded articles, in addition, in the production method disclosed in WO 2014/196605 and Japanese Patent No. 6007945, a magnetic thin strip and/or magnetic powder is obtained. Then, a bonded magnet and/or a sintered magnet, that is, a molded article is obtained using such a magnetic thin strip and/or magnetic powder.

The molded article is obtained using a mold. Therefore, the degree of freedom in shape of the molded article is not so high. In addition, in order to produce a motor core in which permanent magnets (molded articles) of a plurality of types of shapes are installed, it is necessary to prepare molds for molding a plurality of types of permanent magnets, in addition, when a cavity part is provided in a soft magnetic plate laminate and a permanent magnet (molded article) is embedded into the cavity part, a punching mold for providing the cavity part is necessary. FIG. 7A is a schematic diagram showing a soft magnetic plate laminate used for a motor core in the related art. FIG. 7B is a schematic diagram showing a permanent magnet (molded article) used in a motor core in the related art. In order to obtain a motor core 30 in which a permanent magnet 60 of the molded article shown in FIG. 7B is embedded into a laminate of soft magnetic plates 11, through-holes 70 are punched into the soft magnetic plates 11 using a mold, and the through-holes 70 are connected to form a cavity part. Then, the permanent magnet 60 is inserted into the cavity part. In addition, when the permanent magnet 60 has shapes of a plurality of types, since the cavity part also has shapes of a plurality of types, it is necessary to prepare a plurality of types of punching molds. In addition, when a motor core including a permanent magnet having a complicated shape in which the cross-sectional shape and area of the permanent magnet differ in the direction in which the soft magnetic plates 11 are laminated is produced, it may be difficult to insert the permanent magnet into the cavity part of the laminate of the soft magnetic plates 11. There is a need to provide a method of producing a motor core with a higher degree of freedom in design.

The inventors found that a motor core in which a permanent magnet is installed in a soft magnetic plate laminate has a problem of a low degree of freedom in design of the motor core due to the method of producing the motor core.

The present disclosure provides a method of producing a motor core through which it is possible to produce a motor core having a high degree of freedom in design.

A first aspect of the present disclosure relates to a method of producing a motor core. The method of producing a motor core includes preparing a soft magnetic plate containing a transition metal element, preparing a modifying member containing an alloy having a melting point lower than a melting point of the soft magnetic plate, bringing the modifying member into contact with a part of a plate surface of the soft magnetic plate, causing the modifying member to diffuse and penetrate into the soft magnetic plate from a contact surface between the soft magnetic plate and the modifying member, and forming a hard magnetic phase-containing part in a part of the soft magnetic plate, and laminating a plurality of soft magnetic plates on each other after the modifying member is brought into contact with the part of the plate surface of the soft magnetic plate.

In the first aspect, the alloy may be an R-M alloy. R is a rare earth element. M is an element that lowers a melting point of the R-M alloy to below the melting point of the soft magnetic plate.

In the above aspect, the plurality of soft magnetic plates may be laminated on each other after causing the modifying member to diffuse and penetrate into the soft magnetic plate.

In the above aspect, the plurality of soft magnetic plates may be laminated on each other before causing the modifying member to diffuse and penetrate into the soft magnetic plate.

In the above aspect, in a direction of a plate surface of the soft magnetic plate, a contact position of the modifying member in at least one of the soft magnetic plates may be different from a contact position of the modifying member in the other soft magnetic plates. A formation position of the hard magnetic phase-containing part in at least one of the soft magnetic plates may be different from a formation position of the hard magnetic phase-containing part in the other soft magnetic plates.

In the above aspect, the composition of the modifying member that is brought into contact with at least one of the soft magnetic plates may be different from the composition of the modifying member that is brought into contact with the other soft magnetic plates. The composition of a hard magnetic phase in the hard magnetic phase-containing part in at least one of the soft magnetic plates may be different from the composition of a hard magnetic phase in the hard magnetic phase-containing part in the other soft magnetic plates.

In the above aspect, the composition of at least one of the soft magnetic plates may be different from the composition of the other soft magnetic plates. The composition of a hard magnetic phase in the hard magnetic phase-containing part in at least one of the soft magnetic plates may be different from the composition of a hard magnetic phase in the hard magnetic phase-containing part in the other soft magnetic plates.

In the above aspect, at least one additional soft magnetic plate may be additionally laminated without coming into contact with the modifying member.

In the above aspect, the modifying member may be heated to a temperature that is equal to or higher than the melting point of the R-M alloy and lower than the melting point of the soft magnetic plate, and the modifying member may diffuse and penetrate into the soft magnetic plate.

In the above aspect, in a heat treatment furnace, the soil magnetic plate and the modifying member may be heat-treated at a temperature that is equal to or higher than the melting point of the R-M alloy and lower than the melting point of the soft magnetic plate, and the modifying member may diffuse and penetrate into the soft magnetic plate.

In the above aspect, the soft magnetic plate with which the modifying member is brought into contact may be put into a microwave emitting chamber, microwaves may be made to cause resonance at a position of the modifying member, the modifying member may be heated to a temperature that is equal to or higher than the melting point of the R-M alloy and lower than the melting point of the soft magnetic plate, and the modifying member may diffuse and penetrate into the soft magnetic plate.

In the above aspect, the soft magnetic plate with which the modifying member is brought into contact may be put into a microwave emitting chamber, microwaves may be made to cause resonance at both a position of the soft magnetic plate and a position of the modifying member, the soft magnetic plate and the modifying member may be heated to a temperature that is equal to or higher than the melting point of the R-M alloy and lower than the melting point of the soft magnetic plate, and the modifying member may diffuse and penetrate into the soft magnetic plate.

In the above aspect, a heating wire may be brought into contact with the modifying member, a current may flow through the heating wire, the modifying member may be heated to a temperature that is equal to or higher than the melting point of the R-M alloy and lower than the melting point of the soft magnetic plate, and the modifying member may diffuse and penetrate into the soft magnetic plate.

In the above aspect, R may be one or more elements selected from the group consisting of Nd, La, Ce, Pr, Sm, Gd, Tb, and Dy.

In the above aspect, M may be one or more elements selected from the group consisting of Ga, Zn, Si, Al, Fe, Co, Ni, Cu, Cr, Mg, Ag, and Au.

In the above aspect, the R-M alloy may include an Nd—Cu alloy.

In the above aspect, the soft magnetic plate may contain one or more alloys or metals selected from the group consisting of soft magnetic alloys and soft magnetic transition metals.

In the above aspect, the soft magnetic alloy may be a T-B soft magnetic alloy or a T-N soft magnetic alloy.

In the above aspect, T may be a transition metal element and may be one or more elements selected from the group consisting of Fe, Co, and Ni.

In the above aspect, the soft magnetic transition metal may be one or more metals selected from the group consisting of Fe and Co.

In the above aspect, the soft magnetic plate may contain an Fe—B alloy.

In the above aspect, the hard magnetic phase-containing part may contain an $R_2Fe_{14}B$ phase.

According to respective aspects of the present disclosure, it is possible to provide a method of producing a motor core in which a rare earth element diffuses and penetrates into a soft magnetic plate, a hard magnetic phase-containing part is formed at a predetermined position of a soft magnetic plate laminate, and thus a motor core having a high degree of freedom in design can be produced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A method of producing a motor core according to an embodiment of the present disclosure will be described below in detail. Here, the following embodiment does not limit the method of producing a motor core of the present disclosure.

First, the principle of a method of producing a motor core of the present disclosure will be described with reference to the drawings.

Transition metal elements and rare earth elements readily form magnetic compounds. Therefore, a rare earth element easily diffuses into a soft magnetic material containing a transition metal element (hereinafter simply referred to as a "soft magnetic material"). Examples of a method of diffusing a rare earth element in a soft magnetic material include a method of performing a heat treatment when a modifying material is brought into contact with a soft magnetic material. The modifying material contains a low melting point alloy of a rare earth element and a specific metal element.

Figure 1A:
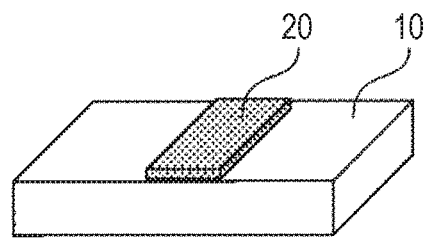
FIG. 1A is an explanatory diagram showing a state in which a soft magnetic material is in contact with a modifying material.
Figure 1B:
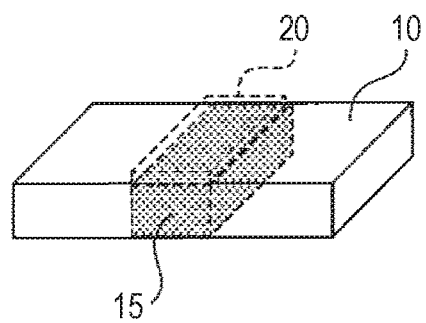
FIG. 1B is an explanatory diagram showing a state in which a modifying material diffuses and penetrates into a soft magnetic material.

FIG. 1A is an explanatory diagram showing a state in which a soft magnetic material is in contact with a modifying material. FIG. 1B is an explanatory diagram showing a state in which a modifying material diffuses and penetrates into a soft magnetic material. As shown in FIG. 1A, a soft magnetic material 10 is brought into contact with a modifying material 20. In the state shown in FIG. 1A, when the soft magnetic material 10 and the modifying material 20 are heated, the modifying material 20 diffuses and penetrates into the soft magnetic material 10. Therefore, a hard magnetic phase-containing part 15 can be formed in a part into which the modifying material 20 has diffused and penetrated. In this manner, the inventors found that the hard magnetic phase-containing part 15 can be formed on a part of the soft magnetic material 10, and a state as if a permanent magnet was embedded in a part of the soft magnetic material 10 can be realized.

Based on these findings, requirements for constructing a method of producing a motor core of the present disclosure will be described below.

The method of producing a motor core of the present disclosure includes a soft magnetic plate preparing process, a modifying member preparing process, a contact process, and a diffusion and penetration process. In addition, a laminating process is optionally included. Hereinafter, respective processes will be described.

Soft Magnetic Plate Preparing Process

A soft magnetic plate containing a transition metal element (hereinafter simply referred to as a "soft magnetic plate") is prepared. In the diffusion and penetration process to be described below, a transition metal element in the soft magnetic plate and a rare earth element diffusing and penetrating into the soft magnetic material form a hard magnetic phase-containing part. In order to form a hard magnetic phase-containing part, a transition metal element contained in the soft magnetic plate is preferably one or more elements selected from the group consisting of Fe, Co, and Ni, more preferably one or more elements selected from the group consisting of Fe and Co, and still more preferably Fe, but the present disclosure is not limited thereto.

The soft magnetic plate is not particularly limited as long as it contains a transition metal element. However, the content of an element that inhibits formation of a hard magnetic phase-containing part or an element that deteriorates magnetic properties of a hard magnetic phase-containing part is preferably low. Examples of such a soft magnetic plate include plates including a T-B soft magnetic alloy (T is a transition metal element, and B is boron), a T-N soft magnetic alloy (T is a transition metal element, and N is nitrogen), a soft magnetic transition metal, and a combination thereof.

Next, the T-B soft magnetic alloy, the T-N soft magnetic alloy, and the soft magnetic transition metal will be described, and a plate containing such an alloy or metal will also be described.

T-B Soft Magnetic Alloy

The T-B soft magnetic alloy contains, as main components, B and a transition metal element which is alloyed with B and exhibits soft magnetism. T in the T-B soft magnetic alloy forms an R-T-B phase together with R (rare earth element) in a hard magnetic phase-containing part formed in the diffusion and penetration process to be described below as a hard magnetic phase. Examples of R-T-B phases include an $R_2T_{14}B$ phase. When the content of B in the T-B soft magnetic alloy is small, an R-T hard magnetic phase may be contained. Examples of R-T hard magnetic phases include an $RT_5$ phase, an $R_2T_{17}$ phase, and an $RT_{12}$ phase.

In order to obtain the R-T-B phase in an amount which is practically acceptable for a motor core, the content of B in the T-B soft magnetic alloy may be 1 atom % or more, 3 atom % or more, 5 atom % or more, 10 atom % or more, 15 atom % or more, or 20 atom % or more. On the other hand, in order to minimize the content of B that does not contribute to formation of the R-T-B phase, the content of B in the T-B soft magnetic alloy may be 50 atom % or less, 40 atom % or less, 35 atom % or less, 30 atom % or less, or 25 atom % or less. Accordingly, the T-B soft magnetic alloy may be an alloy containing 1 to 50 atom % of B, and T (I is a transition metal element) and inevitable impurity elements. Here, the content of T may be 50 to 99 atom %. Alternatively, the T-B soft magnetic alloy may be an alloy containing 1 to 50 atom % of B with the remainder being made up of T (T is a transition metal element) and inevitable impurity elements.

The T-B soft magnetic alloy may optionally contain elements other than the above main components as long as effects of the method of producing a motor core of the present disclosure are not impaired and as long as characteristics of the resulting product (motor core) obtained in the method of producing a motor core of the present disclosure are not impaired. Examples of such an element include an element that inhibits coarsening of crystal grains of a soft magnetic plate, an element that improves corrosion resistance of a soft magnetic plate, and inevitable impurity elements.

Examples of an element that inhibits coarsening of crystal grains of a soft magnetic plate include Cu and Si, Cu is copper, and Si is silicon. Examples of an element that improves corrosion resistance of a soft magnetic plate include Ti, Nb, and Ta. Ti is titanium, Nb is niobium, and Ta is tantalum. A total content of Cu, Si, Ti, Nb, and Ta may be 0 atom % or more, 1 atom % or more, 10 atom % or more, 15 atom % or more, or 20 atom % or more, and may be 40 atom % or less, 35 atom % or less, 30 atom % or less, or 25 atom % or less.

The inevitable impurity elements are impurity elements of which inclusion cannot be avoided or which cause a significant increase in the production cost in order to avoid them such as impurity elements contained in raw materials of the T-B soft magnetic alloy or impurity elements mixed in during a production process.

According to the above description, the T-B soft magnetic alloy may be, for example, an alloy containing 1 to 50 atom % of B, 0 to 40 atom % of one or more elements selected from the group consisting of Cu, Si, Ti, Nb, and Ta, and T (T is a transition metal element other than Cu, Ti, Nb, and Ta) and inevitable impurities. Alternatively, the T-B soft magnetic alloy may be, for example, an alloy containing 1 to 50 atom % of B, and 0 to 40 atom % of one or more elements selected from the group consisting of Cu, Si, Ti, Nb, and Ta with the remainder being made up of T is a transition metal element other than Cu, Ti, Nb, and Ta) and inevitable impurity elements.

Examples of T-B soft magnetic alloys include an Fe alloy containing 4 to 40 atom % of B (hereinafter referred to as a "Fe—B alloy").

B in the Fe—B alloy forms, for example, an $R_2Fe_{14}B$ phase, together with R (rare earth element) and Fe in a hard magnetic phase-containing part formed in the diffusion and penetration process to be described below as a hard magnetic phase. In order to obtain the $R_2Fe_{14}B$ phase in an amount which is practically acceptable for a motor core, the content of B in the Fe—B alloy may be 4 atom % or more, 10 atom % or more, 15 atom % or more, or 20 atom % or more. On the other hand, in order to minimize the content of B that does not contribute to formation of the $R_2Fe_{14}B$ phase, the content of B in the Fe—B alloy may be 40 atom % or less, 35 atom % or less, 30 atom % or less, or 25 atom % or less.

In the hard magnetic phase-containing part, inclusion of a phase other than the hard magnetic phase is allowed as long as its amount is small. Examples of phases other than the hard magnetic phase include a phase in which an Fe—B alloy that has not formed an $R_2Fe_{14}B$ phase remains and a phase in which R that has not formed an $R_2Fe_{14}B$ phase remains. Typical examples of a phase in which R remains include an R-rich phase. The R-rich phase refers to a phase having a larger content of R than the $R_2Fe_{14}B$ phase. In addition, the R-rich phase does not necessarily have a specific crystal structure and may be amorphous.

In the motor core, in order to secure a function of the hard magnetic phase-containing part as the hard magnetic phase, the content of the hard magnetic phase may be 60 volume % or more, 70 volume % or more, 80 volume % or more, or 90 volume % or more with respect to the entire hard magnetic phase-containing part. On the other hand, in the motor core, in order to allow a phase other than the hard magnetic phase to be included in the hard magnetic phase-containing part as long as its amount is small, the content of the hard magnetic phase may be 99 volume % or less, 98 volume % or less, 97 volume % or less, 96 volume % or less, or 95 volume % or less with respect to the entire hard magnetic phase-containing part.

Some or all of Fe in the Fe—B alloy may be substituted with Co. When some of Fe is substituted with Co, due to the Slater-Pauling rule, in the hard magnetic phase, the spontaneous magnetization increases, and both the anisotropic magnetic field and the saturation magnetization increase. As a result, a higher output can be obtained in a motor using a motor core obtained in the production method of the present disclosure. In this regard, the substitution rate of Co (a molar ratio of Co with respect to a total amount of Fe, Co, and Ni) may be 0.30 or less, 0.25 or less, or 0.20 or less. Here, in the Fe—B alloy, when all of Fe is not substituted with Co, the substitution rate of Co (the molar ratio of Co with respect to a total amount of Fe, Co, and Ni) is 0.

In addition, when some of Fe is substituted with Co, not only the Curie point of the soft magnetic plate is improved but also the Curie point of the hard magnetic phase formed in the diffusion and penetration process to be described below is improved. As a result, in a motor using a motor core obtained in the production method of the present disclosure, an output at a high temperature is improved. In this regard, the substitution rate of Co (the molar ratio of Co with respect to a total amount of Fe, Co, and Ni) may be 0.05 or more, 0.10 or more, or 0.15 or more. In the hard magnetic phase in which a high anisotropic magnetic field and a high saturation magnetization are not required as much, the substitution rate of Co (the molar ratio of Co with respect to a total amount of Fe, Co, and Ni) may be 0.25 or more, and all of Fe may be substituted with Co.

In addition, some of Fe may be substituted with Ni. Thereby, the spontaneous magnetization of the hard magnetic phase formed in the diffusion and penetration process to be described below is improved. The substitution rate of Ni (the molar ratio of Ni with respect to a total amount of Fe, Co, and Ni) may be 0.05 or more, 0.10 or more, or 0.15 or more, and may be 0.3 or less, 0.25 or less, or 0.20 or less.

The Fe—B alloy may optionally contain elements other than the above components as long as effects of the method of producing a motor core of the present disclosure are not impaired and as long as characteristics of the resulting product (motor core) obtained in the method of producing a motor core of the present disclosure are not impaired. Examples of such an element include an element that inhibits coarsening of crystal grains of a soft magnetic plate, an element that improves corrosion resistance of a soft magnetic plate, and inevitable impurity elements.

Examples of an element that inhibits coarsening of crystal grains of a soft magnetic plate include Cu and Si. Cu is copper, and Si is silicon. The content of Cu may be 0 atom % or more, 0.5 atom % or more, or 1.0 atom % or more, and may be 2.0 atom % or less, 1.7 atom % or less, or 1.5 atom % or less. The content of Si may be 0 atom % or more, 2 atom % or more, or 5 atom % or more, and may be 20 atom % or less, 15 atom % or less, or 10 atom % or less.

Examples of an element that improves corrosion resistance of a soft magnetic plate include Ti, Nb, and Ta. Ti is titanium, Nb is niobium, and Ta is tantalum. A total content of Ti, Nb, and Ta may be 0 atom % or more, 1 atom % or more, 2 atom % or more, 3 atom % or more, 4 atom % or more, or 5 atom % or more, and may be 10 atom % or less, 9 atom % or less, 8 atom % or less, 7 atom % or less, or 6 atom % or less.

According to the above description, the Fe—B alloy may be, for example, an alloy containing 4 to 40 atom % of B, 0 to 2.0 atom % of Cu, 0 to 20 atom % of Si, 0 to 30 atom % of Co, 0 to 30 atom % of Ni, and 0 to 10 atom % of one or more elements selected from the group consisting of Ti, Nb, and Ta, and Fe and inevitable impurity elements. Alternatively, the Fe—B alloy may be, for example, an alloy containing 4 to 40 atom % of B, 0 to 2.0 atom % of Cu, 0 to 20 atom % of Si, 0 to 30 atom % of Co, 0 to 30 atom % of Ni, and 0 to 10 atom % of one or more elements selected from the group consisting of Ti, Nb, and Ta with the remainder being made up of Fe and inevitable impurity elements. Here, the content of each element is within the above range so that a total amount of B, Cu, Si, Co, Ni, Ti, Nb, Ta, Fe, and inevitable impurity elements is 100 atom %.

In a "plate containing a T-B soft magnetic alloy", inclusion of substances other than the T-B soft magnetic alloy is allowed as long as effects of the method of producing a motor core of the present disclosure are not impaired and as long as characteristics of the resulting product (motor core) obtained in the method of producing a motor core of the present disclosure are not impaired. For example, it means that a corrosion-resistant coating and/or insulation coating other than the T-B soft magnetic alloy may be provided on a side surface of the plate.

Examples of corrosion-resistant coatings and/or insulation coatings include a coating containing a resin and colloidal silica, a coating containing a resin and alumina sol, a coating containing a resin and zirconia sol, and a coating containing a resin and phosphate. A coating combining these may be used.

Substances other than the T-B soft magnetic alloy may further include inevitable impurities. The inevitable impurities refer to impurities of which inclusion cannot be avoided or which cause a significant increase in the production cost in order to avoid them such as impurities in raw materials and impurities mixed in during a production process. The inevitable impurities include inevitable impurity elements.

T-N Soft Magnetic Alloy

The T-N soft magnetic alloy contains, as main components, N and a transition metal element which is alloyed with N and exhibits soft magnetism. T in the T-N soft magnetic alloy forms an R-T-N phase together with R (rare earth element) and N in a hard magnetic phase-containing part formed in the diffusion and penetration process to be described below as a hard magnetic phase. Examples of R-T-N phases include a $R_2T_{17}N_3$ phase. When the content of N in the T-N soft magnetic alloy is small, an R-T hard magnetic phase may be contained, and examples of R-T hard magnetic phases include an $RT_5$ phase, an $R_2T_{17}$ phase, and an $RT_{12}$ phase.

In order to obtain the R-T-N phase in an amount which is practically acceptable for a motor core, the content of N in the T-N soft magnetic alloy may be 1 atom % or more, 3 atom % or more, 5 atom % or more, 10 atom % or more, 15 atom % or more, or 20 atom % or more. On the other hand, in order to minimize the content of N that does not contribute to formation of the R-N-B phase, the content of N in the T-N soft magnetic alloy may be 45 atom % or less, 40 atom % or less, 35 atom % or less, 30 atom % or less, or 25 atom % or less. Accordingly, the T-N soft magnetic alloy may be an alloy containing 1 to 45 atom % of N, and T a is a transition metal element) and inevitable impurity elements. Here, the content of T may be 55 to 99 atom %. Alternatively, the T-N soft magnetic alloy may be an alloy containing 1 to 45 atom % of N with the remainder being made up of (T is a transition metal element) and inevitable impurity elements.

The T-N soft magnetic alloy may optionally contain elements other than the above main components as long as effects of the method of producing a motor core of the present disclosure are not impaired and as long as characteristics of the resulting product (motor core) obtained in the method of producing a motor core of the present disclosure are not impaired. Examples of such an element include an element that inhibits coarsening of crystal grains of a soft magnetic plate, an element that improves corrosion resistance of a soft magnetic plate, and inevitable impurity elements.

Examples of an element that inhibits coarsening of crystal grains of a soft magnetic plate include Cu and Si. Cu is copper, and Si is silicon. Examples of an element that improves corrosion resistance of a soft magnetic plate include Ti, Nb, and Ta. Ti is titanium, Nb is niobium, and Ta is tantalum. A total content of Cu, Si, Ti, Nb, and Ta may be 0 atom % or more, 1 atom % or more, 10 atom % or more, 15 atom % or more, or 20 atom % or more, and may be 40 atom % or less, 35 atom % or less, 30 atom % or less, or 25 atom % or less.

The inevitable impurity elements are impurity elements of which inclusion cannot be avoided or which cause a significant increase in the production cost in order to avoid them such as impurity elements contained in raw materials of the T-N soft magnetic alloy or impurity elements mixed in during a production process.

According to the above description, the T-N soft magnetic alloy may be, for example, an alloy containing 1 to 45 atom % of N, 0 to 40 atom % of one or more elements selected from the group consisting of Cu, Si, Ti, Nb, and Ta, and T (T is a transition metal element other than Cu, Ti, Nb, and Ta) and inevitable impurity elements. Alternatively, the T-N soft magnetic alloy may be, for example, an alloy containing 1 to 45 atom % of N, and 0 to 40 atom % of one or more elements selected from the group consisting of Cu, Si, Ti, Nb, and Ta with the remainder being made up of T (T is a transition metal element other than Cu, Ti, Nb, and Ta) and inevitable impurity elements.

Examples of T-N soft magnetic alloys include an Fe alloy containing 5 to 30 atom % of N (hereinafter referred to as a "Fe—N alloy").

N in the Fe—N alloy forms, for example, an $R_2Fe_{17}N_3$ phase, together with R (rare earth element) and Fe in a hard magnetic phase-containing part formed in the diffusion and penetration process to be described below as a hard magnetic phase. In order to obtain the $R_2Fe_{17}N_3$ phase in an amount which is practically acceptable for a motor core, the content of N in the Fe—N alloy may be 5 atom % or more, 10 atom % or more, or 15 atom % or more. On the other hand, in order to minimize the content of N that does not contribute to formation of the $R_2Fe_{17}N_3$ phase, the content of N in the Fe—N alloy may be 30 atom % or less, 25 atom % or less, or 20 atom % or less.

In the hard magnetic phase-containing part, inclusion of a phase other than the hard magnetic phase is allowed as long as its amount is small. Examples of phases other than the hard magnetic phase include a phase in which an Fe—N alloy that has not formed an $R_2Fe_{17}N_3$ phase remains and a phase in which R that has not formed an $R_2Fe_{17}N_3$ phase remains.

In the motor core, in order to secure a function of the hard magnetic phase-containing part as the hard magnetic phase, the content of the hard magnetic phase may be 60 volume % or more, 70 volume % or more, 80 volume % or more, or 90 volume % more with respect to the entire hard magnetic phase-containing part. On the other hand, in the motor core, in order to allow a phase other than the hard magnetic phase to be included in the hard magnetic phase-containing part as long as its amount is small, the content of the magnetic phase may be 99 volume % or less, 98 volume % or less, 97 volume % or less, 96 volume % or less, or 95 volume % or less with respect to the entire hard magnetic phase-containing part.

As in the Fe—B alloy, some or all of Fe in the Fe—N alloy may be substituted with Co. In addition, the substitution rate of Co (the molar ratio of Co with respect to a total amount of Fe, Co, and Ni) is the same as in the Fe—B alloy.

In addition, as in the Fe—B alloy, some of Fe may be substituted with Ni. Here, the substitution rate of Ni (the molar ratio of Ni with respect to a total amount of Fe, Co, and Ni) is the same as in the Fe—B alloy.

The Fe—N alloy may optionally contain elements other than the above components as long as effects of the method of producing a motor core of the present disclosure are not impaired and as long as characteristics of the resulting product (motor core) obtained in the method of producing a motor core of the present disclosure are not impaired. Examples of such an element include an element that inhibits coarsening of crystal grains of a soft magnetic plate, an element that improves corrosion resistance of a soil magnetic plate, and inevitable impurity elements.

Examples of an element that inhibits coarsening of crystal grains of a soil magnetic plate include Cu and Si. Cu is copper, and Si is silicon. The content of Cu may be 0 atom % or more, 0.5 atom % or more, or 1.0 atom % or more, and may be 2.0 atom % or less, 1.7 atom % or less, or 1.5 atom % or less. The content of Si may be 0 atom % or more, 2 atom % or more, or 5 atom % or more, and may be 20 atom % or less, 15 atom % or less, or 10 atom % or less.

Examples of an element that improves corrosion resistance of a soft magnetic plate include Ti, Nb, and Ta. Ti is titanium, Nb is niobium, and Ta is tantalum. A total content of Ti, Nb, and Ta may be 0 atom % or more, 1 atom % or more, 2 atom % or more, 3 atom % or more, 4 atom % or more, or 5 atom % or more and may be 10 atom % or less, 9 atom % or less, 8 atom % or less, 7 atom % or less, or 6 atom % or less.

According to the above description, the Fe—N alloy may be, for example, an alloy containing 5 to 30 atom % of N, 0 to 2.0 atom % of Cu, 0 to 20 atom % of Si, 0 to 30 atom % of Co, 0 to 30 atom % of Ni, 0 to 10 atom % of one or more elements selected from the group consisting of Ti, Nb, and Ta, and Fe and inevitable impurity elements. Alternatively, the Fe—N alloy may be, for example, an alloy containing 5 to 30 atom % of N, 0 to 2.0 atom % of Cu, 0 to 20 atom % of Si, 0 to 30 atom % of Co, 0 to 30 atom % of Ni, and 0 to 10 atom % of one or more elements selected from the group consisting of Ti, Nb, and Ta with the remainder being made up of Fe and inevitable impurity elements. Here, the content of each element is within the above range so that a total amount of N, Cu, Si, Co, Ni, Ti, Nb, Ta, Fe, and inevitable impurity elements is 100 atom %.

A description of the "plate containing a T-N soft magnetic alloy" would be similar to that of the "plate containing a T-B soft magnetic alloy."

Soft Magnetic Transition Metal

The soft magnetic transition metal refers to a soft magnetic transition metal having a purity of 97 mass % or more, 98 mass % or more, or 99 mass % or more. The purity may not be 100 mass % because inclusion of inevitable impurities is allowed. The inevitable impurities refer to impurities of which inclusion cannot be avoided or which cause a significant increase in the production cost in order to avoid them such as impurities contained in raw materials of the soft magnetic transition metal or impurities mixed in during a process of producing the soft magnetic transition metal.

Examples of soft magnetic transition metals include iron (Fe) and/or cobalt (Co). In such soft magnetic transition metals, those having the above purity may be called pure iron, pure cobalt, or pure nickel. In a hard magnetic phase-containing part formed in the diffusion and penetration process to be described below, as a hard magnetic phase, iron forms, for example, an $R_2Fe_{17}$ phase, together with a rare earth element (R). Examples of $R_2Fe_{17}$ phases include a $Sm_2F_{17}$ phase. Sm is samarium. Here, the $R_2Fe_{17}$ phase may be nitrided after its formation to obtain an $R_2Fe_{17}N_3$ phase. Cobalt forms, for example, an $RCo_5$ phase, together with a rare earth element (R). Examples of $RCo_5$ phases include a $SmCo_5$ phase.

In the hard magnetic phase-containing part, inclusion of a phase other than the hard magnetic phase is allowed as long as its amount is small. Examples of phases other than the hard magnetic phase include a phase ($\alpha Fe$ phase) in which Fe that has not formed an $R_2Fe_{17}$ phase remains, and a phase in which R that has not formed an $R_2Fe_{17}$ phase remains. In addition, examples of phases other than the hard magnetic phase include a phase (a Co phase and a Ni phase) in which Co and Ni that has not formed a hard magnetic phase remains and a phase in which R that has not formed a hard magnetic phase containing Co or Ni remains.

In the motor core, in order to secure a function of the hard magnetic phase-containing part as the hard magnetic phase, the content of the hard magnetic phase may be 60 volume % or more, 70 volume % or more, 80 volume % or more, or 90 volume % more with respect to the entire hard magnetic phase-containing part. On the other hand, in the motor core, in order to allow a phase other than the hard magnetic phase to be included in the hard magnetic phase-containing part as long as its amount is small, the content of the hard magnetic phase may be 99 volume % or less, 98 volume % or less, 97 volume % or less, 96 volume % or less, or 95 volume % or less.

A description of the "plate containing a soft magnetic transition metal" would be similar to that of the "plate containing a T-B soft magnetic alloy."

Thickness of Soft Magnetic Plate

Next, the thickness of the soft magnetic plate will be described. Unless otherwise specified, the following description does not depend on the type (including a soft magnetic transition metal) of the alloy in the soft magnetic plate.

The thickness of the soft magnetic plate is not particularly limited as long as it does not adversely affect characteristics of a motor core obtained in the production method of the present disclosure and does not interfere with the subsequent process. In order to secure the strength of the soft magnetic plate and improve handling properties in each process, the thickness of the soft magnetic plate may be, for example, 0.10 mm or more, 0.15 mm or more, 0.20 mm or more, 0.25 mm or more, or 0.30 mm or more. On the other hand, in the diffusion and penetration process to be described below, in order for the modifying member to diffuse and penetrate into a surface opposite to a contact surface between the soft magnetic plate and the modifying member, and in order to minimize the eddy current loss of the motor core, a thinner soil magnetic plate is preferable. Thus, the thickness of the soft magnetic plate may be, for example, 2.00 mm or less, 1.50 mm or less, 0.80 mm or less, or 0.60 mm or less.

Method of Producing a Soft Magnetic Plate

Next, the method of producing a soft magnetic plate will be described. Unless otherwise specified, the following description does not depend on the type (including a soft magnetic transition metal) of the alloy in the soft magnetic plate.

The method of producing a soft magnetic plate is not particularly limited, and a commercially available plate-like soft magnetic material may be used. The soft magnetic plate may be processed in advance into a planar shape (a form of a surface perpendicular to a rotation shaft of the motor) of the motor core obtained in the production method of the present disclosure, or may be processed into a planar shape of the motor core during or at the end of the production method of the present disclosure. When the plate is processed in advance into the planar shape of the motor core, it is possible to reduce the size of a device used in the production method of the present disclosure. On the other hand, when a plurality of unit cores are produced using one soft magnetic plate and the plate is processed into a planar shape of the motor core during or at the end of the production method of the present disclosure, a large number of unit cores can be produced at one time. The motor core obtained in the production method of the present disclosure is a laminate, and the unit core is one core constituting the laminate. The processing method is not particularly limited, and typical examples thereof include punching.

Examples of a method of producing a soft magnetic plate include a method in which a molten material which is adjusted such that a soft magnetic plate has the above composition is prepared and cast into a template to prepare an ingot, and the ingot is rolled to obtain a soft magnetic plate with a desired plate thickness. Rolling may be repeated and a heat treatment may be appropriately performed before and after each rolling to remove strain and/or adjust the structure.

Examples of a method of producing a soft magnetic plate include a method in which a molten material which is adjusted such that a soft magnetic plate has the above composition is prepared, and the molten material is quenched according to a liquid quenching method or a strip casting method to obtain a soft magnetic plate. A part or all of the soft magnetic plate obtained in this manner may be amorphous. Alternatively, soft magnetic plate may be heated to obtain a desired structure.

The structure of the soft magnetic plate is preferably nanocrystallized. When a modifying member diffuses and penetrates into the soft magnetic plate to form a hard magnetic phase-containing part, the hard magnetic phase-containing part has both a hard magnetic phase and a soft magnetic phase depending on the composition of the soft magnetic plate. The soft magnetic phase in the hard magnetic phase-containing part is derived from a soft magnetic phase in the soft magnetic plate that has not formed a hard magnetic phase together with a rare earth element in the modifying member when the modifying member diffuses and penetrates. In the hard magnetic phase-containing part, when the hard magnetic phase and the soft magnetic phase are nanocrystallized, an exchange interaction is exerted thereon. As a result, it is possible to improve the energy product of the hard magnetic phase-containing part and improve the output of the motor using the motor core obtained in the production method of the present disclosure.

The surface of the soft magnetic plate is preferably degreased by removing a coating such as an oxide film. Thereby, the modifying member easily diffuses and penetrates into the surface of the soft magnetic plate. Regarding a method of removing a coating such as an oxide film, well-known methods, for example, washing with a solution and/or surface polishing, can be applied. Regarding the degreasing method, well-known methods, for example, washing with a solution, can be applied.

Modifying Member Preparing Process

A modifying member containing an R-M alloy (in this specification, it may be simply referred to as a "modifying member") is prepared. R is a rare earth element, and M is an element that makes the melting point of the R-M alloy lower than the melting point of the soft magnetic plate. In this specification, the rare earth elements are 17 elements including Sc, Y, La, Ce, Pr, Nd, Pm, Sm, Eu, Gd, Tb, Dy, Ho, Er, Tm, Yb, and Lu. Sc is scandium, Y is yttrium, La is lanthanum, Ce is cerium, Pr is praseodymium, Nd is neodymium, Pm is promethium, Sm is samarium, Eu is europium, Gd is gadolinium, Tb is terbium, Dy is dysprosium, Ho is holmium, Er is erbium, Tm is thulium, Yb is ytterbium, and Lu is ruthenium.

In the R-M alloy in the modifying member, since R and M are alloyed, the melting point of the R-M alloy is lower than the melting point of the soft magnetic plate. Thereby, the modifying member can diffuse and penetrate into the soft magnetic plate without modifying the soft magnetic plate in the diffusion and penetration process to be described below.

In the modifying member containing an R-M alloy, inclusion of a substance other than the R-M alloy is allowed as long as effects of the method of producing a motor core of the present disclosure are not impaired and as long as characteristics of the resulting product (motor core) obtained in the method of producing a motor core of the present disclosure are not impaired. Typical examples of substances other than the R-M alloy include inevitable impurities. The inevitable impurities refer to impurities of which inclusion cannot be avoided or which cause a significant increase in the production cost in order to avoid them such as impurities in raw materials of the R-M alloy and impurities mixed in during a process of producing the R-M alloy. The inevitable impurities include inevitable impurity elements.

When the melting point of the R-M alloy is lower than the melting point of the soft magnetic plate, types of R and M, and the content of M are not limited. R is typically one or more elements selected from the group consisting of Nd, La, Ce, Pr, Sm, Gd, Tb, and Dy. M is typically one or more elements selected from the group consisting of Ga, Zn, Si, Al, Fe, Co, Ni, Cu, Cr, Mg, Ag, and Au. In the R-M alloy, typically, the content of M is 10 to 50 atom %, and R refers to the remainder and inevitable impurity elements.

Typical examples of R-M alloys include Nd—Cu alloys, Pr—Cu alloys, Nd—Al alloys, Pr—Al alloys, Nd—Pr—Al alloys, Nd—Fe alloys, Pr—Fe alloys, Nd—Ga alloys, Pr—Ga alloys, Nd—Ni alloys, Pr—Ni alloys, Nd—Zn alloys, and Pr—Zn alloys. The melting point of these typical alloys is 470° C. or higher, 485° C. or higher or 500° C. or higher, and 850° C. or lower, 800° C. or lower, 750° C. or lower, 700° C. or lower, or 650° C. or lower.

The Nd—Cu alloy may contain, in addition to Nd and Cu, an element that does not substantially impair effects of the method of producing a motor core of the present disclosure and does not substantially impair characteristics of the resulting product (motor core) obtained in the method of producing a motor core of the present disclosure if its amount is small (0 to 5 atom % with respect to the entire Nd—Cu alloy). In addition, examples of such an element include one or more elements selected from the group consisting of Ga Zn, Si, Al, Cr, Mg, Ag, and Au. In addition to these elements, the Nd—Cu alloy may further include inevitable impurity elements. The inevitable impurity elements are impurity elements of which inclusion cannot be avoided or which cause a significant increase in the production cost in order to avoid them such as impurity elements contained in raw materials of the Nd—Cu alloy and impurity elements mixed in during a process of producing the Nd—Cu alloy. The description regarding the Nd—Cu alloy also applies to the above typical alloys other than the Nd—Cu alloy.

Among the above typical alloys, an Nd—Cu alloy is preferable in consideration of the balance between easy diffusion and penetration of the modifying member into the soft magnetic plate in the diffusion and penetration process to be described below, and favorable magnetic properties of the hard magnetic phase obtained when the modifying member diffuses and penetrates. Examples of preferable Nd—Cu alloys include an alloy containing 20 to 50 atom % of Cu with the remainder being made up of Nd and inevitable impurity elements. Particularly preferable examples of Nd—Cu alloys include an alloy containing 20 to 40 atom % of Cu with the remainder being made up of Nd and inevitable impurity elements.

In the above typical alloys, as long as magnetic properties of the motor core do not cause any practical problem, some or all of Nd can be substituted with one or more elements selected from the group consisting of La, Ce, Pr, and Sm, which are less rare than Nd. The substitution rate (molar ratio) of one or more elements selected from the group consisting of La, Ce, Pr, and Sin may be 0 or more, 0.1 or more, 0.2 or more, 0.3 or more, or 0.4 or more, and may be 1.0 or less, 0.9 or less, 0.8 or less, 0.7 or less, or 0.6 or less. When substitution with two or more elements selected from the group consisting of La, Ce, Pr, and Sm is performed, the substitution rate is a total substitution rate of elements.

In addition, when some or all of Nd is substituted with one or more elements selected from the group consisting of Gd, Tb, and Dy, it is possible to improve magnetic properties of the motor core, and particularly, magnetic properties at a high temperature (130 to 170° C.). The substitution rate (molar ratio) of one or more elements selected from the group consisting of Gd, Tb, and Dy may be 0 or more, 0.1 or more, 0.2 or more, 0.3 or more, or 0.4 or more, and may be 1.0 or less, 0.9 or less, 0.8 or less, 0.7 or less, or 0.6 or less. When substitution with two or more elements selected from the group consisting of Gd, Tb, and Dy is performed, the substitution rate is a total substitution rate of these elements. When the soft magnetic plate is nanocrystallized, coarsening of nanocrystals is inhibited in the diffusion and penetration process to be described below. In this case, the substitution rate (molar ratio) of one or more elements selected from the group consisting of Gd, Tb, and Dy is 0.5 or less, 0.4 or less, or preferably 0.3 or less.

An amount of a modifying member 21 that is brought into contact with a soft magnetic plate 11 is appropriately determined according to an amount (atom %) of rare earth elements in the modifying member 21 with respect to the unit thickness (mm) of the soft magnetic plate 11. The amount (atom %) of rare earth elements in the modifying member 21 with respect to the unit thickness of the soft magnetic plate 11 may be 7 atom %/mm or more, 8 atom %/mm or more, or 9 atom %/mm or more, and may be 20 atom %/mm or less, 15 atom %/mm or less, or 12 atom %/mm or less.

The surface of the modifying member is preferably degreased by removing a coating such as an oxide film. Thereby, the modifying member easily diffuses and penetrates into the surface of the soft magnetic plate. Regarding a method of removing a coating such as an oxide film, well-known methods, for example, washing with a solution and/or surface polishing, can be applied. Regarding the degreasing method, well-known methods, for example, washing with a solution, can be applied.

The method of producing a modifying member is not particularly limited as long as the subsequent process is not interfered with and characteristics of the resulting product (motor core) obtained in the production method of the present disclosure are not inhibited.

Examples of a method of producing a modifying member include a method in which a molten material which is adjusted such that a modifying member has the above composition is prepared and the molten material is cast into a template to obtain an ingot. The ingot is preferably heated to reduce segregation in the ingot.

Examples of a method of producing a modifying member include a method in which a molten material which is adjusted such that a modifying member has the above composition is prepared, and the molten material is quenched according to a liquid quenching method or a strip casting method to obtain a modifying member. When the molten material is quenched according to a liquid quenching method or a strip casting method, segregation of the obtained modifying member is less compared to the above method of obtaining the ingot. The heat treatment may be additionally performed to further reduce segregation.

Contact Process

A modifying member is brought into contact with a part of a plate surface of the soft magnetic plate. When the modifying member covers the entire surface of the soft magnetic plate, in the diffusion and penetration process to be described below, the modifying member diffuses and penetrates into the entire soft magnetic plate, and the entire area of the soft magnetic plate becomes a hard magnetic phase-containing part and does not function as a motor core. Therefore, the modifying member is brought into contact with a part of the plate surface of the soft magnetic plate. Here, the plate surface of the soft magnetic plate refers to a surface perpendicular to the thickness direction of the soft magnetic plate.

Figure 2A:
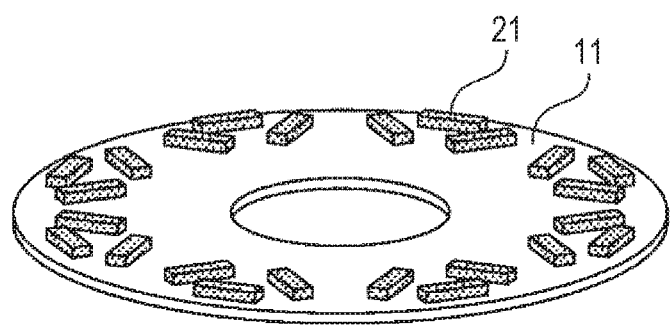
FIG. 2A is an explanatory diagram showing an example in which a modifying member is brought into contact with a part of a plate surface of a soft magnetic plate in a mode in which a plurality of soft magnetic plates are laminated after the modifying member diffuses and penetrates.

A mode in which a modifying member is brought into contact with a part of the plate surface of the soft magnetic plate will be described with reference to the drawings. FIG. 2A shows a diagram showing a mode in which a modifying member is brought into contact with a part of the plate surface of the soft magnetic plate. While an example of a rotor of an interior permanent magnet motor is shown in FIG. 2A, the present disclosure is not limited thereto. In the mode shown in FIG. 2A, a through-hole is provided in the central part of the soft magnetic plate 11, and the rotation shaft of the motor is inserted into the through-hole, but the present disclosure is not limited thereto. In addition, in the mode shown in FIG. 2A, the outer circumference of the soft magnetic plate 11 is circular, but the present disclosure is not limited thereto, and for example, a notch may be provided on the outer circumference of the soft magnetic plate 11.

Examples of a mode of contact include a case in which the surface of the bulk body modifying member 21 is brought into contact with a part of the plate surface of the soft magnetic plate 11 as shown in FIG. 2A. 24 modifying members 21 are shown in the mode shown in FIG. 2A. However, the number of modifying members is not limited thereto, and it may be, for example, 8, 16, 40, or 48 as long as the modifying members do not cover the entire plate surface of the soft magnetic plate 11. In addition, the rectangular parallelepiped modifying member 21 is shown in the mode in FIG. 2A, but the present disclosure is not limited thereto, and the member may have, for example, a cubic, rectangular columnar, cylindrical, elliptical columnar, and segmented (C-shaped) columnar shape, and a combination thereof. A large number of bulk body modifying members 21 can be prepared in advance, and when the soft magnetic plate 11 is punched into a predetermined shape in advance, the soft magnetic plate 11 and the modifying member 21 are easily brought into contact with each other in the punching process.

Figure 3A:
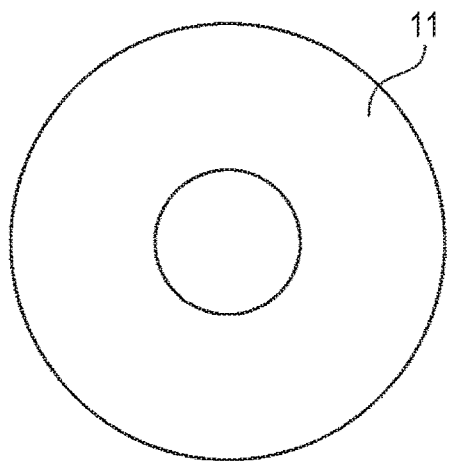
FIG. 3A is a plan view showing an example of a soft magnetic plate before a modifying member is brought into contact.
Figure 3B:
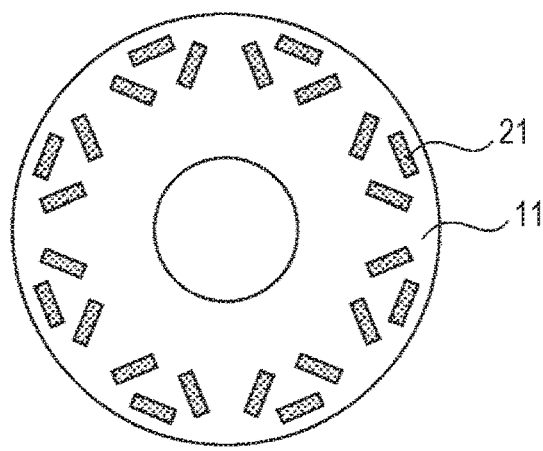
FIG. 3B is a plan view showing an example of a state in which a modifying member having a shape of one type is brought into contact with a soft magnetic plate.
Figure 3C:
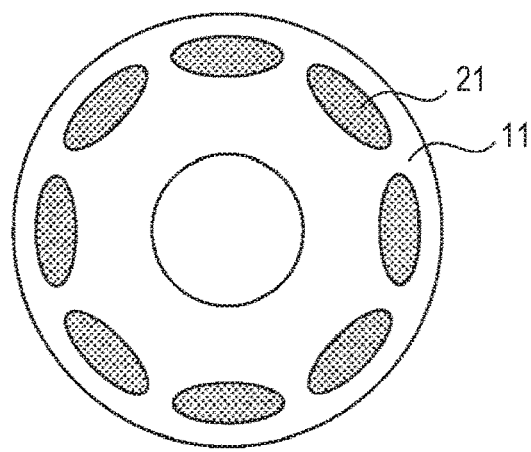
FIG. 3C is a plan view showing an example of a state in which a modifying member having a shape different from that in FIG. 3B is brought into contact with a soft magnetic plate.
Figure 3D:
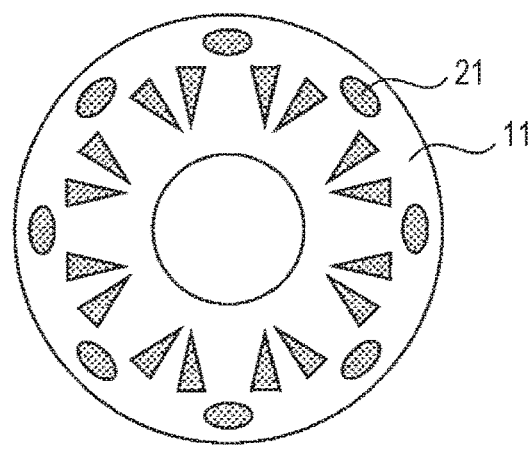
FIG. 3D is a plan view showing an example of a state in which a modifying member having shapes of two types is brought into contact with a soft magnetic plate.

Specific examples of the number of bulk body modifying members 21 and the shape thereof will be described with reference to the drawings. The number of bulk body modifying members 21 and the shape thereof are not limited to these specific examples. FIG. 3A is a plan view showing an example of a soft magnetic plate before the modifying member is brought into contact (a diagram when viewed in the plate thickness direction of the soft magnetic material). FIG. 3B is a plan view showing an example of a state in which a (bulk body) modifying member having a shape of one type is brought into contact with a soft magnetic plate. FIG. 3C is a plan view showing an example of a state in which a (bulk body) modifying member having a shape different from that in FIG. 3B is brought into contact with a soft magnetic plate. FIG. 3D is a plan view showing an example of a state in which a (bulk body) modifying member having shapes of two types is brought into contact with a soft magnetic plate.

The bulk body modifying member 21 can be brought into contact with the plate surface of the soft magnetic plate 11 shown in FIG. 3A, for example, as shown in FIG. 3B, FIG. 3C, and FIG. 3D. As shown in FIG. 3B, 24 rectangular parallelepiped modifying members 21 may be brought into contact with the soft magnetic plate 11. As shown in FIG. 3C, 8 elliptical columnar modifying members 21 may be brought into contact with the soft magnetic plate 11. As shown in FIG. 3D, modifying members 21 of two types of an elliptical column and a triangular prism may be brought into contact with the soft magnetic plate. When modifying members 21 are brought into contact in a plurality of modes shown in FIG. 3B, FIG. 3C, and FIG. 3D using one type of the soft magnetic plate 11 shown in FIG. 3A, the soft magnetic plate 11 having a plurality of types of hard magnetic phase-containing parts 16 is obtained through the diffusion and penetration process to be described below.

The mode of the bulk body is not particularly limited, but may be, for example, an alloy ingot, a green compact, a thin strip laminate, or a combination thereof.

Examples of a method of producing an alloy ingot include casting a molten material of a modifying member into a template. The alloy ingot is preferably heated to reduce segregation. The alloy ingot is advantageous in that a large number of alloy ingots can be produced in a relatively short time.

Examples of a method of producing a green compact include a method in which an alloy ingot and a thin strip or a lamina are crushed to obtain powder, and the powder is compacted. Examples of a method of producing a thin strip or a lamina include a method of cooling a molten material of a modifying member according to a liquid quenching method, a strip casting method, or the like. The green compact is advantageous in that it has less component segregation. In addition, if a large amount of powder is prepared, a large number of green compacts can be prepared in a relatively short time.

Examples of a method of producing a thin strip laminate include a method of laminating a thin strip obtained according to a liquid quenching method, a strip casting method, or the like. The thin strip is advantageous in that it has less component segregation and does not require a mold or the like for lamination. One thin strip may be brought into contact with the soft magnetic plate 11 without laminating thin strips obtained according to a liquid quenching method, a strip casting method, or the like.

As another mode of contact, modifying member powder is made into a slurry, and as shown in FIG. 2A, the slurry-like modifying member 21 is applied to a part of the plate surface of the soft magnetic plate 11, and thus the modifying member 21 may be brought into contact with the part of the plate surface of the soft magnetic plate 11. Unlike the bulk body modifying member 21, application of the slurry-like modifying member 21 is advantageous in that it does not have a mold or the like for molding a bulk body. In particular, when the modifying members 21 of a plurality of types of shapes are prepared, without preparing molds for molding bulk bodies of a plurality of types, the slurry-like modifying member 21 may be simply applied to the soft magnetic plate 11 in a plurality of types of shapes. In addition, the slurry-like modifying member 21 has a higher degree of freedom in shape than the bulk body modifying member 21. In FIG. 2A, the height (a distance in the vertical direction in FIG. 2A) of the slurry-like modifying member indicates a coating thickness of the slurry-like modifying member 21.

Examples of a method of forming modifying member powder into a slurry include a method of mixing modifying member powder in a solvent. The solvent is not limited as long as the modifying member does not change. For example, a non-magnetic slurry containing one or more solvents selected from the group consisting of an acrylic resin, a polyether resin, a urethane resin, a urea resin, a polyester resin, and a butyral resin may be used.

Even if the slurry-like modifying member 21 is applied to a part of the plate surface of the soft magnetic plate 11, specific examples described with reference to FIG. 3A, FIG. 3B, FIG. 3C, and FIG. 3D can be exemplified. For example, as shown in FIG. 3B, FIG. 3C, and FIG. 3D, the slurry-like modifying member 21 can be applied to the soft magnetic plate 11 shown in FIG. 3A. As shown in FIG. 3B, the modifying member 21 may be applied in a rectangular shape at 24 parts of the soft magnetic plate 11. As shown in FIG. 3C, the modifying member 21 may be applied in an elliptical shape at 8 parts of the soft magnetic plate 11. As shown in FIG. 3D, the modifying member 21 may be applied to the soft magnetic plate 11 in two types of shapes including a rectangular shape and an elliptical shape. This is advantageous in that it is not necessary to prepare a mold for molding for each shape of the modifying member 21 when modes shown in FIG. 3B, FIG. 3C, and FIG. 3D are prepared in application of the slurry-like modifying member 21.

In any mode of the bulk body modifying member 21 and the slurry-like modifying member 21, at least one of the modifying members 21 of which composition is set to be different from the composition of other modifying members 21 can be brought into contact with the soft magnetic plate 11.

For example, in the mode shown in FIG. 3D, an Fe—B alloy plate is selected as the soft magnetic plate 11, a Nd—Cu alloy is selected as the inner modifying member 21, and an (Nd, Dy)—Cu alloy is selected as the outer modifying member 21, in FIG. 3D, the inner modifying member 21 is the modifying member 21 having a triangular prism shape, and the outer modifying member 21 is the modifying member 21 having an elliptical columnar shape. In addition, the (Nd, Dy)—Cu alloy is an alloy in which some of Nd in the Nd—Cu alloy is substituted with Dy. Then, after diffusion and penetration, the hard magnetic phase-containing part 16 containing a $Nd_2Fe_{14}B$ phase is formed in an area with which the Nd—Cu alloy is brought into contact, and the hard magnetic phase-containing part 16 containing an (Nd, $Ce)_2Fe_{14}B$ phase is formed in an area with which the (Nd, Dy)—Cu alloy is brought into contact.

When a motor core 30 obtained by laminating the plurality of soft magnetic plates 11 obtained in this manner is used for the rotor of the interior permanent magnet motor, the following advantages are obtained. The outer hard magnetic phase-containing part 16 that is easily affected by the external magnetic field from the stator contains an (Nd, $Dy)_2Fe_{14}B$ phase and the inner hard magnetic phase-containing part 16 that is hardly affected by the external magnetic field from the stator contains a $Nd_2Fe_{14}B$ phase. Even if the motor becomes hot, the hard magnetic phase-containing part 16 outside the rotor for which a coercive force is particularly necessary contains an (Nd, $Dy)_2Fe_{14}B$ phase, it is possible to maintain the performance of the motor core 30. On the other hand, even if the motor becomes hot, the hard magnetic phase-containing part 16 inside the rotor for which a coercive force is not necessary unlike the hard magnetic phase-containing part 16 outside the rotor contains a $Nd_2Fe_{14}B$ phase. Therefore, it is possible to reduce the amount of expensive Dy used while maintaining the performance of the entire motor core 30.

Soft Magnetic Plate Laminating Process

Optionally, the plurality of soft magnetic plates 11 are laminated on each other. Examples of a mode of lamination include a form in which a plurality of soft magnetic plates 11 into which the modifying member 21 diffuses and penetrates are prepared, and the plurality of soft magnetic plates 11 are laminated on each other. Hereinafter, this form will be referred to as "a form in which a plurality of soft magnetic plates 11 are laminated on each other after the modifying member 21 diffuses and penetrates" in some cases. In another mode of lamination, a plurality of soft magnetic plates 11 with which the modifying member 21 is brought into contact are prepared, and the plurality of soft magnetic plates 11 are laminated on each other before the modifying member 21 diffuses and penetrates. Hereinafter, this form will be referred to as "a form in which the plurality of soft magnetic plates 11 are laminated on each other before the modifying member 21 diffuses and penetrates."

Figure 2B:
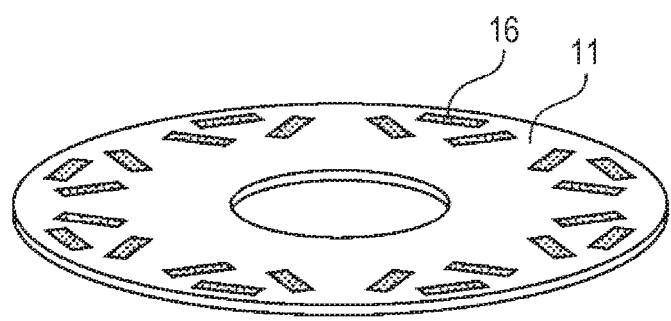
FIG. 2B is an explanatory diagram showing a state in which a hard magnetic phase-containing part is formed in a mode in which a plurality of soft magnetic plates are laminated after a modifying member diffuses and penetrates.
Figure 2C:
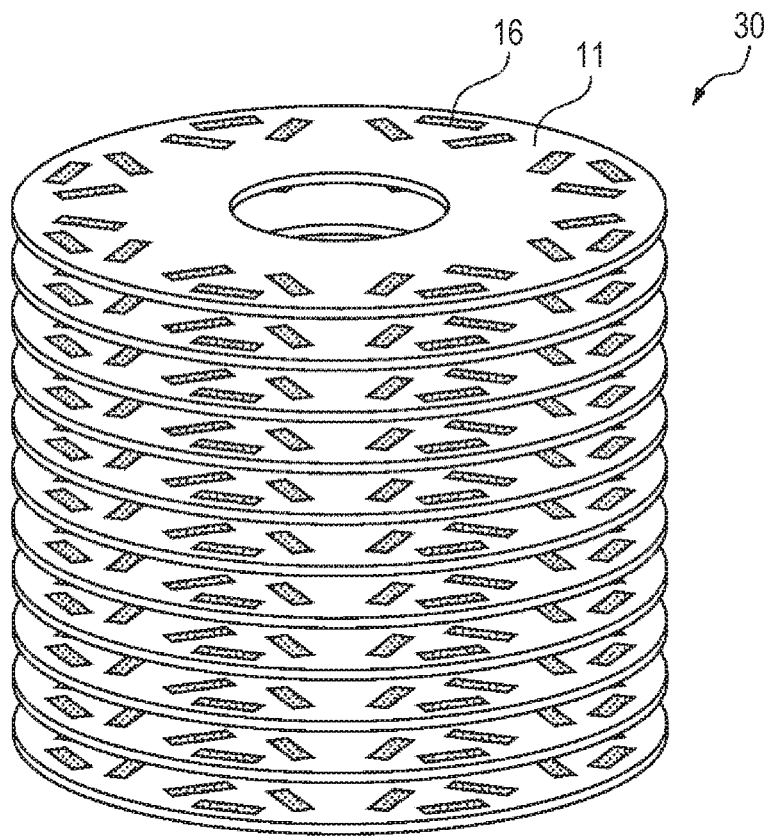
FIG. 2C is an explanatory diagram showing a state in which a plurality of soft magnetic plates having a hard magnetic phase-containing part are laminated on each other in a mode in which a plurality of soft magnetic plates are laminated after a modifying member diffuses and penetrates.

The above lamination modes will be further described with reference to the drawings. Examples of a form in which the plurality of soft magnetic plates 11 are laminated on each other after the modifying member 21 diffuses and penetrates include a form shown in FIG. 2A, FIG. 2B, and FIG. 2C. As shown in FIG. 2A, the modifying member 21 is brought into contact with the soft magnetic plate 11. Then, as shown in FIG. 2B, the modifying member 21 diffuses and penetrates into the soft magnetic plate 11, and the hard magnetic phase-containing part 16 is formed on a part of the soft magnetic plate 11. Then, as shown in FIG. 2C, the plurality of soft magnetic plates 11 having the hard magnetic phase-containing part 16 are laminated on each other to obtain the motor core 30. Here, in FIG. 2C, while the soft magnetic plates 11 are shown separately so that the state of each of the soft magnetic plates 11 can be recognized, the soft magnetic plates 11 are laminated with no gap in the actual motor core 30.

Figure 4A:
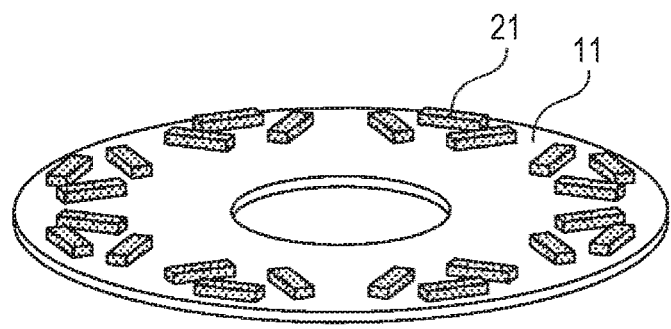
FIG. 4A is an explanatory diagram showing a state in which a modifying member is brought in contact with a soft magnetic plate in a mode in which a plurality of soft magnetic plates are laminated before diffusion and penetration.
Figure 4B:
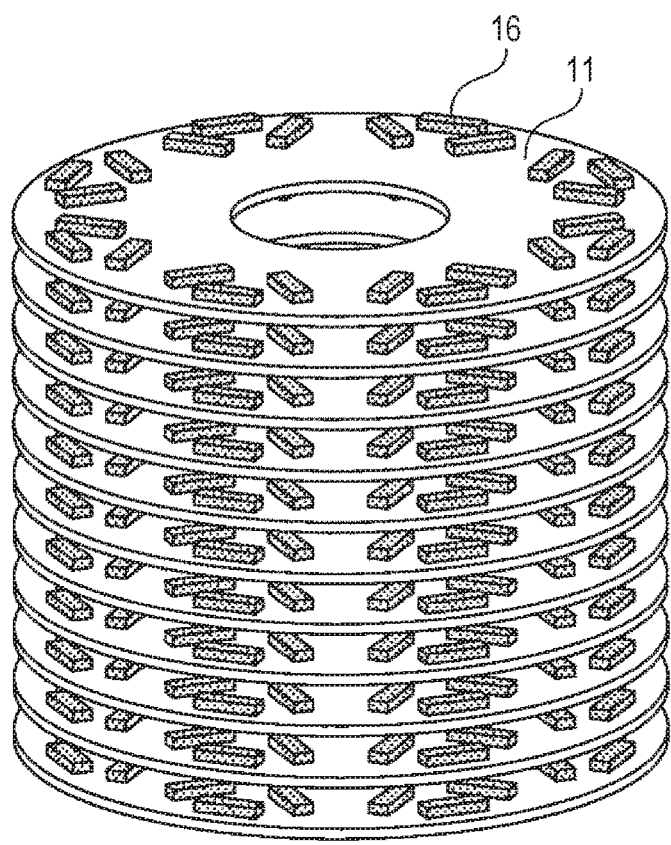
FIG. 4B is an explanatory diagram showing a state in which a plurality of soft magnetic plates are laminated on each other while a modifying member is brought into contact with a soft magnetic plate in a mode in which a plurality of soft magnetic plates are laminated before diffusion and penetration.
Figure 4C:
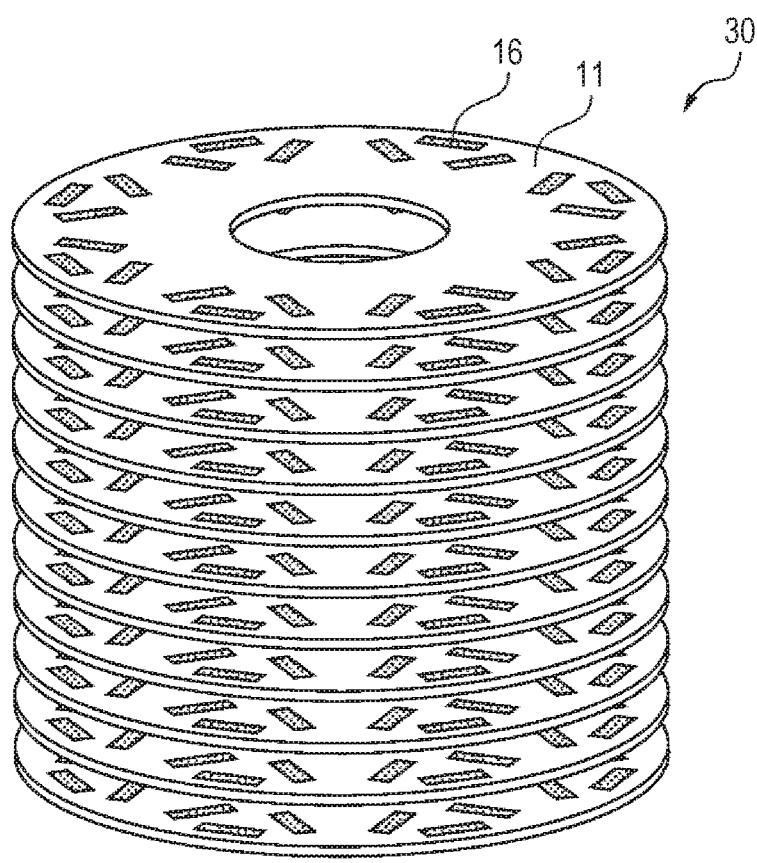
FIG. 4C is an explanatory diagram showing a state in which a hard magnetic phase-containing part is formed in a mode in which a plurality of soft magnetic plates are laminated before diffusion and penetration.

Examples of a form in which the plurality of soft magnetic plates 11 are laminated on each other before diffusion and penetration include a form shown in FIG. 4A, FIG. 4B, and FIG. 4C. As shown in FIG. 4A, the modifying member 21 is brought into contact with the soft magnetic plate 11. Then, the plurality of soft magnetic plates 11 are laminated on each other when the modifying member 21 is brought into contact with the soft magnetic plate 11. Then, in the state shown in FIG. 4B, the modifying member 21 diffuses and penetrates into the soft magnetic plate 11 to obtain a laminate shown in FIG. 4C. In the laminate shown in FIG. 4C, the hard magnetic phase-containing part 16 is formed in a part of each of the soft magnetic plates 11. Here, in FIG. 4C, while the soft magnetic plates 11 are shown separately so that the state of each of the soft magnetic plates 11 can be recognized, the soft magnetic plates 11 are laminated with no gap in the actual motor core 30.

When the plurality of soft magnetic plates 11 are laminated on each other, the composition of the modifying member 21 that is brought into contact with at least one of the soft magnetic plates 11 may be set to be different from the composition of the modifying member 21 that is brought into contact with the other soft magnetic plates 11. Thereby, the composition of the hard magnetic phase in the hard magnetic phase-containing part 16 in at least one of the soft magnetic plates 11 is different from the composition of the hard magnetic phase in the hard magnetic phase-containing part 16 in the other soft magnetic plates 11. Thereby, in the motor core, the composition of the hard magnetic phase-containing part 16 can be changed for each lamination step.

For example, when the motor core 30 shown in FIG. 2C or FIG. 4C is produced, the Fe—B soft magnetic plate 11 to which the modifying member 21 containing a Nd—Cu alloy is brought into contact and the Fe—B soft magnetic plate 11 to which the modifying member 21 containing a Ce—Cu alloy is brought into contact are prepared. Then, these are alternately laminated before or after the modifying member 21 diffuses and penetrates. Then, in the motor core 30 shown in FIG. 2C or FIG. 4C, the hard magnetic phase-containing part 16 containing a $Nd_2Fe_{14}B$ phase and the hard magnetic phase-containing part 16 containing a $Ce_2Fe_{14}B$ phase are alternately formed for each lamination step. Thereby, some of Nd is substituted with inexpensive Ce in the entire hard magnetic phase-containing part 16, and thus the amount of Nd used can be reduced while minimizing deterioration of magnetic properties of the entire motor core 30. The compositions of the modifying member and the soft magnetic plate, the arrangement during lamination, and the like are not limited to examples shown here.

In addition, when the plurality of soft magnetic plates 11 are laminated on each other, the composition of at least one of the soft magnetic plates 11 may be set to be different from the composition of the other soft magnetic plates 11. Thereby, the composition of the hard magnetic phase in the hard magnetic phase-containing part 16 in at least one of the soft magnetic plates 11 is different from the composition of the hard magnetic phase in the hard magnetic phase-containing part 16 in the other soft magnetic plates 11.

For example, when the motor core 30 shown in FIG. 2C or FIG. 4C is produced, the Fe—B soft magnetic plate 11 with which the modifying member 21 containing a Nd—Cu alloy is brought into contact and the Fe—N soft magnetic plate 11 with which the modifying member 21 containing a Sm—Cu alloy is brought into contact are prepared. Then, these are alternately laminated before or after the modifying member 21 diffuses and penetrates. Then, in the motor core 30 shown in FIG. 2C or FIG. 4C, the hard magnetic phase-containing part 16 containing a $Nd_2Fe_{14}B$ phase and the hard magnetic phase-containing part 16 containing a $Sm_2Fe_{17}N_3$ phase are alternately formed for each lamination step. Thereby, a highly magnetized $Nd_2Fe_{14}B$ phase and a highly coercive $Sm_2Fe_{17}N_3$ phase coexist in the entire hard magnetic phase-containing part 16, and the motor core 30 having excellent magnetization and coercive force is obtained. The compositions of the modifying member and the soft magnetic plate, the arrangement during lamination, and the like are not limited to examples shown here.

In the method of producing a motor core of the present disclosure, when the soft magnetic plates 11 are laminated on each other, a position of at least one of the soft magnetic plates 11 with which the modifying member 21 is in contact is set to be different from that of the other soft magnetic plates 11 in the direction of the plate surface of the soft magnetic plate 11, and the plurality of soft magnetic plates 11 may be laminated on each other. Thereby, in the direction of the plate surface of the soft magnetic plate 11, a position of the hard magnetic phase-containing part 16 formed in at least one of the soft magnetic plates 11 can be set to be different from that of the hard magnetic phase-containing part 16 in the other soft magnetic plates 11. This will be described with reference to the drawings. Here, the direction of the plate surface of the soft magnetic plate 11" is the direction in a projection plane parallel to the plate surface of the soft magnetic plate 11.

Figure 5A:
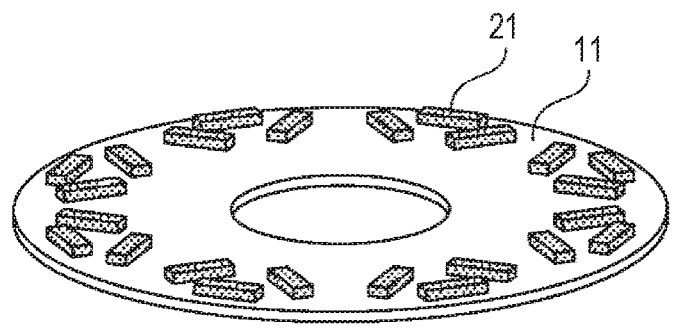
FIG. 5A is an explanatory diagram showing a state in which a modifying member is brought into contact with 24 parts on a plate surface of a soft magnetic plate.
Figure 5B:
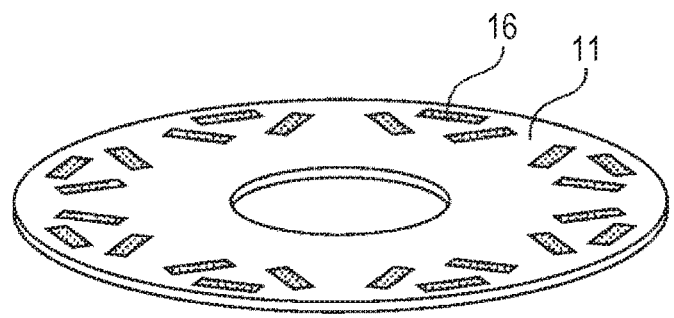
FIG. 5B is an explanatory diagram showing a state in which a modifying member is brought into contact as shown in FIG. 5A to form a hard magnetic phase-containing part.
Figure 5C:
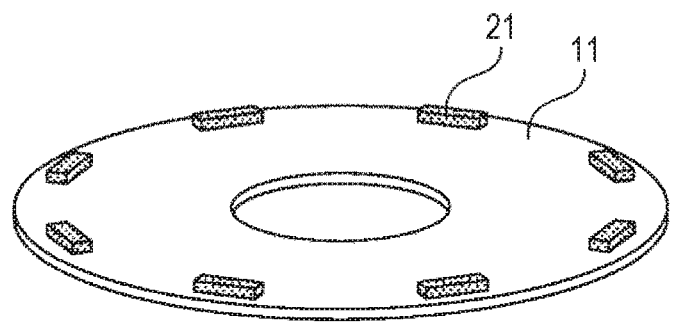
FIG. 5C is an explanatory diagram showing a state in which a modifying member is brought into contact with 8 parts on a plate surface of a soft magnetic plate.
Figure 5D:
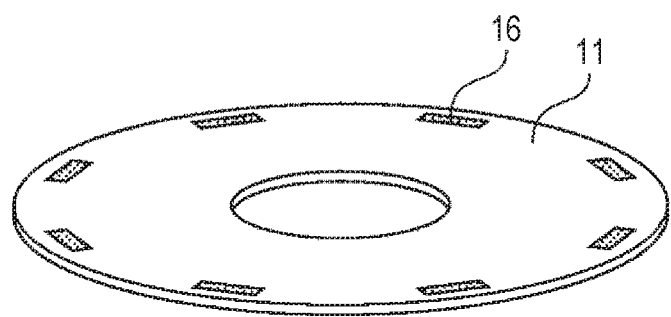
FIG. 5D is an explanatory diagram showing a state in which a modifying member is brought into contact as shown in FIG. 5C to form a hard magnetic phase-containing part.
Figure 5E:
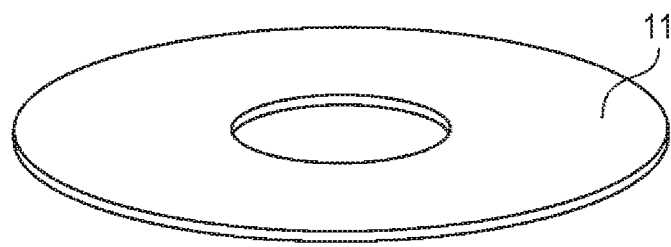
FIG. 5E is an explanatory diagram showing an additional soft magnetic plate with which no modifying member is brought into contact.

FIG. 5A is an explanatory diagram showing a state in which the modifying member 21 is brought into contact with 24 parts on the plate surface of the soft magnetic plate 11. FIG. 5B is an explanatory diagram showing a state in which the modifying member 21 is brought into contact as shown in FIG. 5A to form the hard magnetic phase-containing part 16. FIG. 5C is an explanatory diagram showing a state in which the modifying member 21 is brought into contact with 8 parts on the plate surface of the soft magnetic plate 11. FIG. 5D is an explanatory diagram showing a state in which the modifying member 21 is brought into contact as shown in FIG. 5C to form the hard magnetic phase-containing part 16. FIG. 5E is an explanatory diagram showing the soft magnetic plate 11 with which the modifying member 21 is not brought into contact and which has no hard magnetic phase-containing part.

Among 24 modifying members 21 shown in FIG. 5A, contact positions of 8 modifying members 21 brought into contact along the outer circumference of the soft magnetic plate 11 are the same as contact positions of 8 modifying members 21 shown in FIG. 5C in the direction of the plate surface of the soft magnetic plate 11. That is, among 24 modifying members 21 shown in FIG. 5A, contact positions of 16 (24−8) modifying members 21 are different from contact positions of 8 modifying members 21 shown in FIG. 5C in the direction of the plate surface of the soft magnetic plate 11. The method of producing a motor core of the present disclosure is not limited to the example shown in FIG. 5A and FIG. 5C, and the contact position of at least one of the modifying members 21 may be different between at least one of the soft magnetic plates 11 and the other soft magnetic plates 11 in the direction of the plate surface of the soft magnetic plate 11.

When the modifying member 21 diffuses and penetrates into the soft magnetic plates 11 shown in FIG. 5A and FIG. 5C, the hard magnetic phase-containing parts 16 shown in FIG. 5B and FIG. 5D are formed. Among 24 hard magnetic phase-containing parts 16 shown in FIG. 5B, the formation positions of 16 (24−8) hard magnetic phase-containing parts 16 are different from formation positions of 8 hard magnetic phase-containing parts 16 shown in FIG. 5D in the direction of the plate surface of the soft magnetic plate 11. The method of producing a motor core of the present disclosure is not limited to the example shown in FIG. 5B and FIG. 5D, and the formation position of at least one hard magnetic phase-containing part 16 may be different between at least one of the soft magnetic plates 11 and the other soft magnetic plates 11.

The soft magnetic plate having the hard magnetic phase-containing part 16 formed at the position shown in FIG. 5B is defined as a first unit core 32a. The soft magnetic plate 11 having the hard magnetic phase-containing part 16 formed at the position shown in FIG. 5D is defined as a second unit core 32b. The soft magnetic plate 11 with which the modifying member 21 is not brought into contact and which has no hard magnetic phase-containing part 16 as shown in FIG. 5E is defined as an additional soft magnetic plate 32c. The first unit core, the second unit core, and the additional soft magnetic plate 32c are laminated to obtain the motor core 30.

Figure 5F:
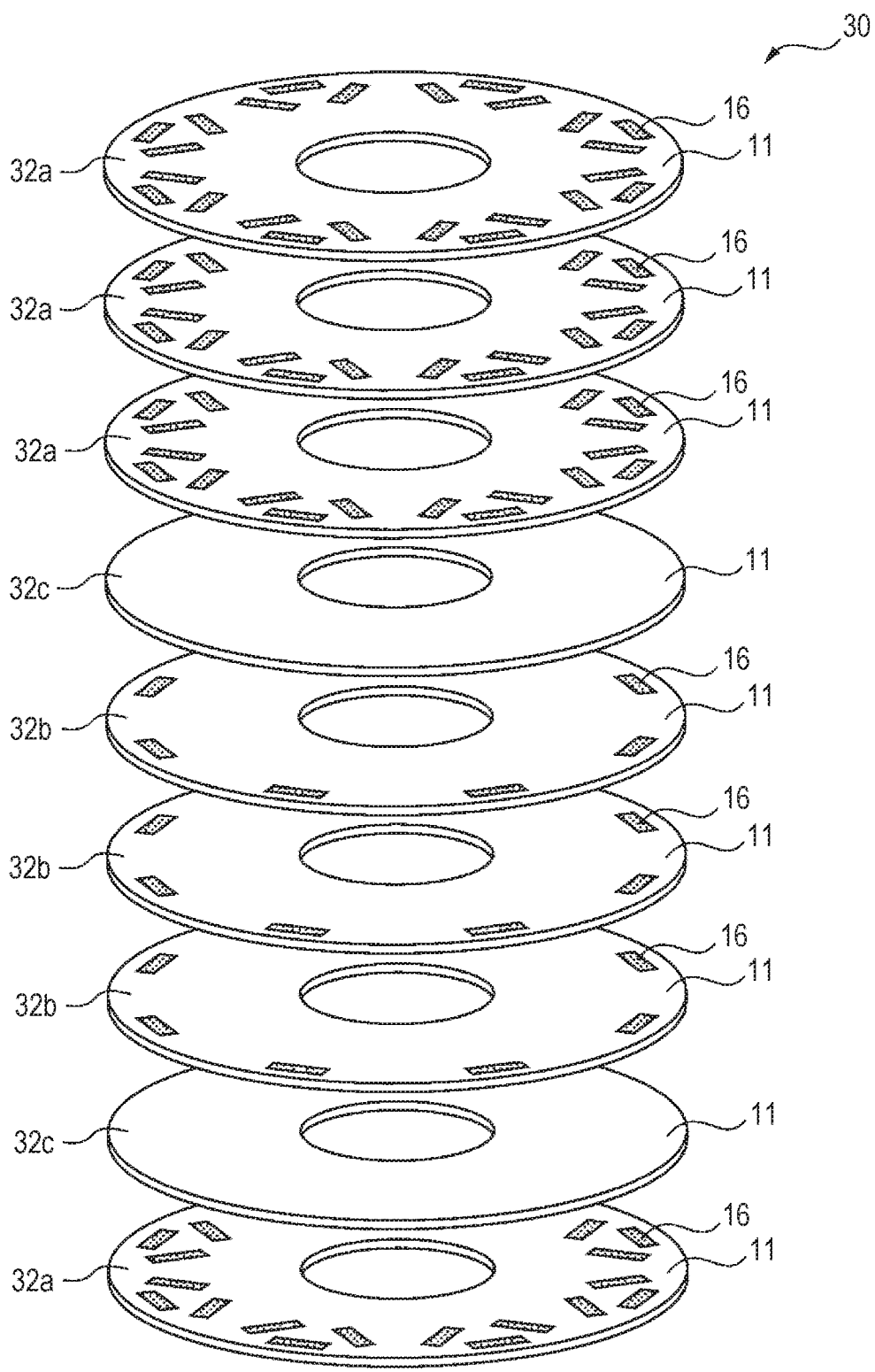
FIG. 5F is a schematic diagram showing a motor core in which the plurality of soft magnetic plates shown in FIG. 5B, FIG. 5D, and FIG. 5E are laminated on each other.

FIG. 5F is a schematic diagram showing a motor core in which the soft magnetic plates shown in FIG. 5B, FIG. 5D, and FIG. 5E (the first unit core 32a, the second unit core 32b, and the additional soft magnetic plate 32c) are laminated. Here, in FIG. 5F, while the first unit core 32a, the second unit core 32b, and the additional soft magnetic plate 32c are shown separately so that the state thereof can be recognized, these are laminated with no gap in the actual motor core 30.

In the mode of the motor core 30 shown in FIG. 5F, from the upper part of the drawing, three first unit cores 32a, one additional soft magnetic plate 32c, three second unit cores 32b, one additional soft magnetic plate 32c, and one first unit core 32a are laminated. The method of producing a motor core of the present disclosure is not limited to the example shown in FIG. 5F, and the number of unit cores can be arbitrarily selected. Thereby, according to the method of producing a motor core of the present disclosure, the formation position of the hard magnetic phase-containing part 16 can be made different for each unit core in the direction of the plate surface of the soft magnetic plate 11.

In the mode of the motor core 30 shown in FIG. 5F, one additional soft magnetic plate 32c is laminated between the first unit core 32a and the second unit core 32b, but the present disclosure is not limited thereto, and the number of additional soft magnetic plates 32c can be arbitrarily selected. The additional soft magnetic plate 32c may not be laminated. In addition, the additional soft magnetic plate 32c may be laminated on at least one of the uppermost part and the lowermost part of the motor core 30. That is, in the method of producing a motor core of the present disclosure, at least one additional soft magnetic plate 32c may be laminated without coming into contact with the modifying member 21.

In the mode of the motor core 30 shown in FIG. 5F, for example, the first unit core 32a is disposed as the second sheet from the top and the second unit core 32b is disposed as the fifth sheet from the top. Thus, the formation position of the hard magnetic phase-containing part 16 in at least one of the soft magnetic plates 11 (the first unit core 32a) is different from the formation position of the hard magnetic phase-containing part 16 in the other soft magnetic plates 11 (the second unit core 32b) in the direction of the plate surface of the soft magnetic plate 11. This is because the contact position of the modifying member 21 in at least one of the soft magnetic plates 11 is set to be different from the contact position of the modifying member 21 in the other soft magnetic plates 11 in the direction of the plate surface of the soft magnetic plate 11.

In the mode of the motor core 30 shown in FIG. 5F, two types of unit cores, the first unit core 32a and the second unit core 32b, are used, but the present disclosure is not limited thereto, and the number of types of unit cores can be arbitrarily selected. In addition, if the entire unit core does not become the hard magnetic phase-containing part 16, the shape and number of hard magnetic phase-containing parts 16 in the unit core are not limited.

The motor core 30 shown in FIG. 5F can be obtained by laminating a plurality of soft magnetic plates before or after the modifying member 21 diffuses and penetrates.

In the method of producing a motor core of the present disclosure, since a plurality of types of unit cores described above are prepared, and additionally, an additional soft magnetic plate is prepared, and these are laminated to obtain a motor core, the degree of freedom in the shape, position, and the like of the hard magnetic phase-containing part in the motor core is very high. Therefore, according to the method of producing a motor core of the present disclosure, it is possible to provide a motor core having a high degree of freedom in design.

Diffusion and Penetration Process

The modifying member 21 diffuses and penetrates into the soft magnetic plate 11, and the hard magnetic phase-containing part 16 is formed in a part of the soft magnetic plate 11. The method is not particularly limited as long as the modifying member 21 can diffuse and penetrate into the soft magnetic plate 11. Exemplary method of diffusing and penetrating the modifying member 21 into the soft magnetic plate 11 include heating the modifying member 21.

The temperature at which the modifying member 21 is heated may be a temperature at which the R-M alloy in the modifying member 21 melts and the soft magnetic plate 11 does not melt. Therefore, the heating temperature may be, for example, the melting point of the R-M alloy or higher, the melting point of the R-M alloy +5° C. or higher, the melting point of the R-M alloy +10° C. or higher, the melting point of the R-M alloy +50° C. or higher, the melting point of the R-M alloy +100° C. or higher, the melting point of the R-M alloy +150° C. or higher, the melting point of the R-M alloy +200° C. or higher, the melting point of the R-M alloy +250° C. or higher, or the melting point of the R-M alloy +300° C. or higher. On the other hand, the heating temperature may be, for example, lower than the melting point of the soft magnetic plate, the melting point of the soft magnetic plate −5° C. or lower, the melting point of the soft magnetic plate −10° C. or lower, the melting point of the soft magnetic plate −50° C. or lower, the melting point of the soft magnetic plate −100° C. or lower, the melting point of the soft magnetic plate −150° C. or lower, the melting point of the soft magnetic plate −200° C. or lower, the melting point of the soft magnetic plate −250° C. or lower, or the melting point of the soft magnetic plate −300° C. or lower.

If the modifying member 21 can be heated at the above temperature, a heating method is not limited. Examples of a heating method include a method in which, in a heat treatment furnace, the soft magnetic plate 11 and the modifying member 21 are heated to a temperature that is equal to or higher than the melting point of the R-M alloy and lower than the melting point of the soft magnetic plate 11. Alternatively, the modifying member 21 may be heated to a temperature that is equal to or higher than the melting point of the R-M alloy and lower than the melting point of the soft magnetic plate 11 using microwaves. Alternatively, a heating wire is brought into contact with the modifying member 21, a current flows through the heating wire, and the modifying member 21 is heated to a temperature that is equal to or higher than the melting point of the R-M alloy and lower than the melting point of the soft magnetic plate 11. Hereinafter, respective methods will be described.

First, the heat treatment will be described.

When the plurality of soft magnetic plates 11 with which the modifying member 21 is brought into contact is heated in the heat treatment furnace, a mode in which a plurality of soft magnetic plates are laminated before the modifying member 21 diffuses and penetrates, that is, the mode shown in FIG. 4A, FIG. 4B, and FIG. 4C, is preferable. In this mode, as shown in FIG. 4B, since a large number of soft magnetic plates 11 with which the modifying member 21 is brought into contact are laminated, and a large number of soft magnetic plates 11 can be stored in the heat treatment furnace, the modifying member 21 can diffuse and penetrate into a large number of soft magnetic plates 11 with a single heat treatment. In particular, when a batch-type heat treatment furnace is used, diffusion and penetration in this mode is preferable.

Next, a method of heating the modifying member 21 using microwaves will be described.

When the modifying member 21 is heated using microwaves, a mode in which a plurality of soft magnetic plates 11 are laminated after the modifying member 21 diffuses and penetrates, that is, the mode shown in FIG. 2A, FIG. 2B, and FIG. 2C, is preferable. Since the soft magnetic plates 11 with which the modifying member 21 is brought into contact that are not laminated are stored in a microwave emitting chamber, the microwave emitting chamber need not be enlarged in the plate thickness direction of the soft magnetic plate 11. When the modifying member 21 is heated using microwaves, since a time required for a diffusion and penetration treatment on the modifying member 21 is short, the number of soft magnetic plates 11 that can be subjected to a diffusion and penetration treatment with a single emission of microwaves may be small. Regarding heating the modifying member 21 using microwaves, the following methods may be used.

The soft magnetic plate 11 with which the modifying member 21 is brought into contact is put into the microwave emitting chamber, and microwaves may be made to cause resonance at the position of the modifying member 21 and microwaves may be emitted. Thereby, the modifying member 21 is heated to a temperature that is equal to or higher than the melting point of the R-M alloy and lower than the melting point of the soft magnetic plate 11 while minimizing the thermal influence on the soft magnetic plate 11, and the modifying member 21 can diffuse and penetrate into the soft magnetic plate 11. Accordingly, for example, when the modifying member 21 diffuses and penetrates into the soft magnetic plate 11 of which at least a part is an amorphous material, it is possible to minimize crystallization of the amorphous material.

Alternatively, the soft magnetic plate 11 with which the modifying member 21 is brought into contact is put into the microwave emitting chamber, and microwaves may be made to cause resonance at both the position of the soft magnetic plate 11 and the position of the modifying member 21, and microwaves may be emitted. Thereby, the soft magnetic plate 11 and the modifying member 21 are heated to a temperature that is equal to or higher than the melting point of the R-M alloy and lower than the melting point of the soft magnetic plate 11. Then, the modifying member 21 can diffuse and penetrate into the soft magnetic plate 11. In this case, operational effects other than a heating source for microwave emission can be exhibited. For example, when at least a part of the soft magnetic plate 11 has an amorphous material, the amorphous material can be crystallized while being oriented in a specific direction according to microwave emission.

Next, a method of heating the modifying member 21 using a heating wire will be described.

When the modifying member 21 is heated using a heating wire, a mode in which a plurality of soft magnetic plates are laminated after the modifying member 21 diffuses and penetrates, that is, the mode shown in FIG. 2A, FIG. 2B, and FIG. 2C, is preferable. In the state shown in FIG. 2A, the heating wire can be brought into contact with the upper surface (the surface opposite to the soft magnetic plate 11) of the modifying member 21 relatively simply.

Regardless of the method used to heat the modifying member 21, when melting of the R-M alloy in the modifying member 21 is started once, the rare earth elements in the R-M alloy rapidly penetrate into the soft magnetic plate 11. As a result, the concentration of the rare earth elements in the R-M alloy decreases rapidly. When the R-M alloy is a eutectic alloy, the composition of the un-melted part in the R-M alloy quickly approaches the eutectic composition, and the melting point of the un-melted part in the R-M alloy decreases. Accordingly, when the R-M alloy is a eutectic alloy, a high temperature is set at the beginning of heating, and when diffusion and penetration start, the heating temperature may be lowered. Thereby, diffusion and penetration can be rapidly performed, and at the same time, coarsening of crystal grains of the soft magnetic plate 11 can be inhibited. In this regard, it is preferable that the R-M alloy contain an Nd—Cu alloy.

In order to perform diffusion and penetration rapidly, the heating temperature may be a retention temperature of 550° C. or higher, 600° C. or higher, or 650° C. or higher. On the other hand, in order to inhibit coarsening of crystal grains of the soft magnetic plate 11, the heating temperature may be a retention temperature of 900° C. or lower, 800° C. or lower, 750° C. or lower, or 700° C. or lower. The retention temperature is a temperature at which the soft magnetic plate 11 and the modifying member 21 are held in a certain temperature range after temperature rising is ended and before cooling is started.

The atmosphere during diffusion and penetration is preferably an inert gas atmosphere in order to minimize oxidation of the soft magnetic plate 11 and the modifying member 21, and the inert gas atmosphere includes a nitrogen gas atmosphere.

The diffusion penetration time may be appropriately determined according to a diffusion and penetration method, the thickness of the soft magnetic plate 11, the heating temperature of the modifying member 21, the mass of the soft magnetic plate 11 and the modifying member 21, and the like.

When the soft magnetic plate 11 and the modifying member 21 are heated in the heat treatment furnace, the diffusion penetration time (heat treatment time) may be, for example, 0.1 hours or longer, 0.3 hours or longer, 0.5 hours or longer, 1 hour or longer, 2 hours or longer, 4 hours or longer, 6 hours or longer, or 8 hours or longer, and may be 60 hours or shorter, 30 hours or shorter, 20 hours or shorter, or 10 hours or shorter. The diffusion penetration time (heat treatment time) is a time for which the retention temperature is maintained. When a heating wire is brought into contact with the modifying member 21 and the modifying member 21 is heated, the diffusion penetration time (heating time) may be appropriately determined according to the heat treatment time.

When microwaves are emitted to the modifying member 21, the diffusion penetration time (microwave emission time) may be determined according to the frequency and output of microwaves, the mass of the modifying member 21 that is brought into contact with the soft magnetic plate 11, and the like. When the frequency of microwaves is 2.45 GHz, and the output is 50 W or more, 100 W or more, 200 W or more, 300 W or more, 400 W or more, or 500 W or more, and 1000 W or less, 900 W or less, 800 W or less, 700 W or less, or 600 W or less, the microwave emission time may be 0.5 minutes or longer, 1 minute or longer, 5 minutes or longer, 10 minutes or longer, 30 minutes or longer, 60 minutes or longer, 90 minutes or longer, or 120 minutes or longer, and may be 600 minutes or shorter, 500 minutes or shorter, 400 minutes or shorter, 300 minutes or shorter, or 200 minutes or shorter.

After the modifying member 21 diffuses and penetrates into the soft magnetic plate 11, an insulation coating may be applied to the surface of the soft magnetic plate 11. Thereby, in parts other than the hard magnetic phase-containing part 16, the generation of an eddy current is curbed and an iron loss value is improved. Here, in the hard magnetic phase-containing part 16, the hard magnetic phase-containing part 16 is divided for each lamination according to the insulation coating, but the function of the hard magnetic phase-containing part 16 as a hard magnetic phase undergoes practically no deterioration. The reason for this will be described below.

Examples of insulation coatings include a coating containing a resin and colloidal silica, a coating containing a resin and alumina sol, a coating containing a resin and zirconia sol, and a coating containing a resin and phosphate. A coating combining these may be used. The insulation coating is preferably a coating that secures corrosion resistance of the surface of the soft magnetic plate 11 and the hard magnetic phase-containing part 16.

Use of Motor Core

The motor core obtained in the production method of the present disclosure can be used as a motor core having both a soft magnetic phase and a hard magnetic phase.

Typically, the motor core obtained in the production method of the present disclosure can be used for a rotor of a rotating field type synchronous motor in which an armature coil is provided in a stator and which is magnetized with the rotor, but the present disclosure is not limited thereto. When the motor core obtained in the production method of the present disclosure is used for a rotor of a rotating field type synchronous motor, it can have a surface magnet structure or an embedded magnet structure according to the formation position of the hard magnetic phase-containing part 16. When the hard magnetic phase-containing part 16 is formed on the outer circumferential part of the soft magnetic plate 11, it can be used as a motor core having a surface magnet structure. When the hard magnetic phase-containing part 16 is formed inside the soft magnetic plate 11, it can be used as a motor core having an embedded magnet structure.

Figure 6:
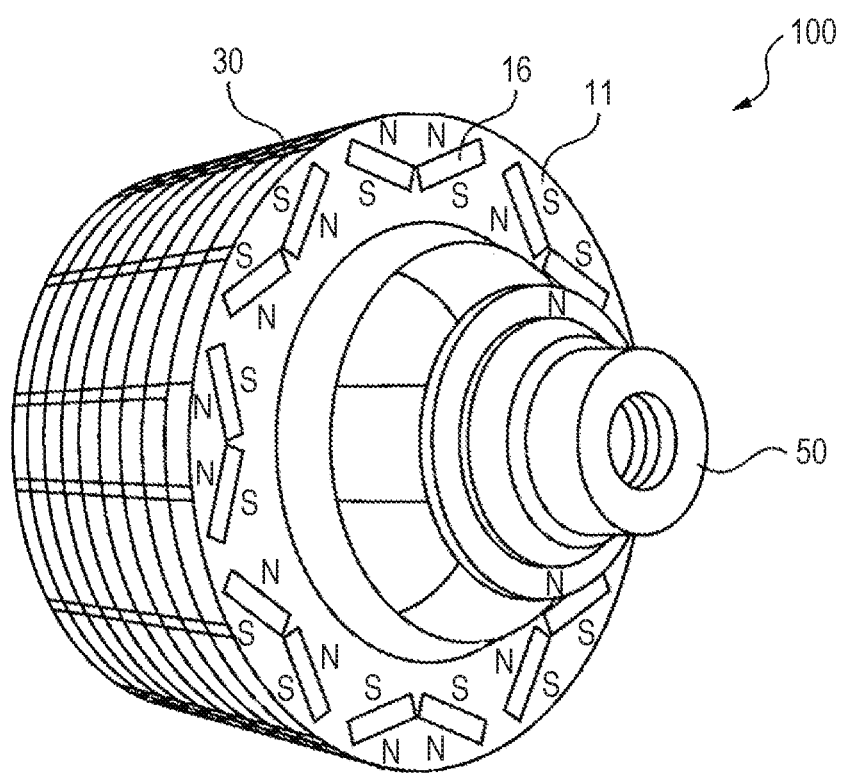
FIG. 6 is a schematic diagram showing an example of a motor core of an embedded magnet structure.
Figure 7A:
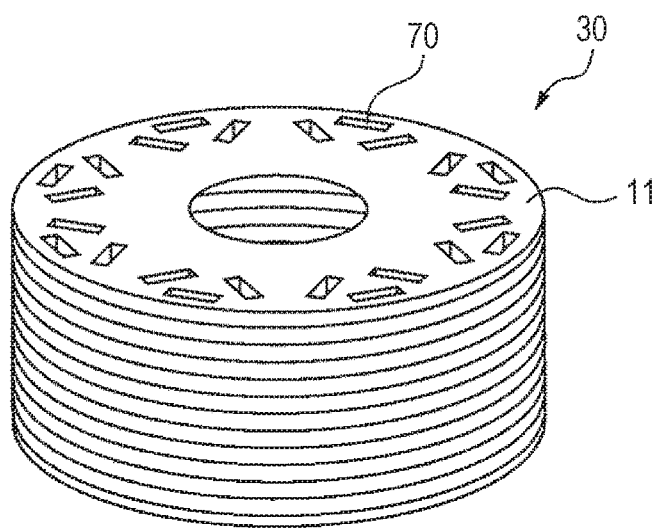
FIG. 7A is a schematic diagram showing a laminate of soft magnetic plates used in a motor core in the related art.
Figure 7B:
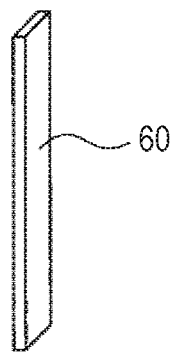
FIG. 7B is a schematic diagram showing a permanent magnet (molded article) used in a motor core in the related art.

FIG. 6 is a schematic diagram showing an example of a motor core of an embedded magnet structure. The motor core 30 shown in FIG. 6 has a structure in which the hard magnetic phase-containing part 16 is disposed further inside than the outer circumference of the laminate of the soft magnetic plate 11 as if the permanent magnet were embedded therein. Here, a rotation shaft 50 is inserted into the central part of the motor core 30, and the motor core shown in FIG. 6 is used as a rotor 100. Without being bound by any theory, regardless of the type of the motor, the hard magnetic phase-containing part 16 (a bulk body permanent magnet in the case of the motor core in the related art) of the motor core is magnetized so that the N pole and S pole face each other in the direction of the plate surface of the soft magnetic plate 11 (direction perpendicular to the rotation shaft of the motor) (refer to FIG. 6). Therefore, it is thought that, even if the hard magnetic phase-containing part 16 is divided for each lamination, the function of the hard magnetic phase-containing part 16 as a hard magnetic phase is substantially the same as an integral (bulk body) permanent magnet having the same shape as the shape of the laminated hard magnetic phase-containing part 16. This is thought to be because the function does not depend on whether there is an insulation coating on each lamination surface of the hard magnetic phase-containing part 16.

Here, according to the method of producing a motor core of the present disclosure, as shown in FIG. 3B, FIG. 3C, FIG. 3D, and FIG. 5F, the hard magnetic phase-containing part 16 has a high degree of freedom in the shape and position. In addition, in FIG. 5F, for example, when the first unit core 32a and the second unit core 32b are alternately laminated, the formation position of the hard magnetic phase-containing part 16 can be made different for each of the soft magnetic plates 11 in the direction of the plate surface of the soft magnetic plate 11. Therefore, the resultant can be used as a motor core having a completely new structure other than the above surface magnet structure and embedded magnet structure.

In addition, the motor core obtained in the production method of the present disclosure can also be used for a stator in, for example, a DC servo motor. According to the present disclosure, when a motor core using permanent magnets of a plurality of types of shapes is produced, there is no need to prepare many types of molds, and the motor core can be produced using a small number of molds. It is easy to produce a plurality of types of motor cores in one line by changing the contact point of the modifying material. In addition, it is possible to produce a motor core including a permanent magnet having a complicated shape that cannot be inserted into a cavity part provided in the soft magnetic plate in the related art. In addition, in the related art, a molten material having a permanent magnet composition is prepared and cooled to obtain an alloy ingot, and magnetic powder obtained by crushing the alloy ingot is then compacted and sintered to produce a permanent magnet. Then, the permanent magnet is inserted into a cavity part provided in the soft magnetic plate to produce a motor core. However, in the present disclosure, the modifying member diffuses and penetrates into the soft magnetic plate, the number of processes is reduced, and thus the motor core can be produced simply.

The above description is only an exemplary embodiment of the method of producing a motor core of the present disclosure, and various modifications can be made within the scope of claims. For example, before or after the hard magnetic phase-containing part 16 is formed, at least a part of the hard magnetic phase-containing part 16 is left and a cavity part is provided in the soft magnetic plate 11, and the cavity part can be made to have neither soft magnetism nor hard magnetism. Alternatively, a permanent magnet is inserted into a cavity part, and thus effects of the method of producing a motor core of the present disclosure and also effects of the permanent magnet may be exhibited.

What is claimed is:

1. A method of producing a motor core, comprising:
    preparing a soft magnetic plate containing a transition metal element;
    preparing a modifying member containing an alloy having a melting point lower than a melting point of the soft magnetic plate;
    bringing the modifying member into contact with a part of a plate surface of the soft magnetic plate;
    causing the modifying member to diffuse and penetrate into the soft magnetic plate from a contact surface between the soft magnetic plate and the modifying member, and forming a hard magnetic phase-containing part in a part of the soft magnetic plate; and
    laminating a plurality of soft magnetic plates on each other after the modifying member is brought into contact with the part of the plate surface of the soft magnetic plate;
    wherein, in a direction of the plate surface of the soft magnetic plate, a contact position of the modifying member in at least one of the soft magnetic plates is different from a contact position of the modifying member in the other soft magnetic plates, and a formation position of the hard magnetic phase-containing part in at least one of the soft magnetic plates is different from a formation position of the hard magnetic phase-containing part in the other soft magnetic plates.

2. The method according to claim 1,
    wherein the alloy is an R-M alloy, and
    wherein R is a rare earth element, and M is an element that lowers a melting point of the R-M alloy to below the melting point of the soft magnetic plate.

3. The method according to claim 2, wherein the modifying member is heated to a temperature that is equal to or higher than the melting point of the R-M alloy and lower than the melting point of the soft magnetic plate, and the modifying member diffuses and penetrates into the soft magnetic plate.

4. The method according to claim 3, wherein, in a heat treatment furnace, the soft magnetic plate and the modifying member are heat-treated at a temperature that is equal to or higher than the melting point of the R-M alloy and lower than the melting point of the soft magnetic plate, and the modifying member diffuses and penetrates into the soft magnetic plate.

5. The method according to claim 3, wherein the soft magnetic plate with which the modifying member is brought into contact is put into a microwave emitting chamber, microwaves are made to cause resonance at a position of the modifying member, the modifying member is heated to a temperature that is equal to or higher than the melting point of the R-M alloy and lower than the melting point of the soft magnetic plate, and the modifying member diffuses and penetrates into the soft magnetic plate.

6. The method according to claim 3, wherein the soft magnetic plate with which the modifying member is brought into contact is put into a microwave emitting chamber, microwaves are made to cause resonance at both a position of the soft magnetic plate and a position of the modifying member, the soft magnetic plate and the modifying member are heated to a temperature that is equal to or higher than the melting point of the R-M alloy and lower than the melting point of the soft magnetic plate, and the modifying member diffuses and penetrates into the soft magnetic plate.

7. The method according to claim 2, wherein R is one or more elements selected from the group consisting of Nd, La, Ce, Pr, Sm, Gd, Tb, and Dy.

8. The method according to claim 2, wherein M is one or more elements selected from the group consisting of Ga, Zn, Si, Al, Fe, Co, Ni, Cu, Cr, Mg, Ag, and Au.

9. The method according to claim 2, wherein the R-M alloy includes an Nd—Cu alloy.

10. The method according to claim 1, wherein the plurality of soft magnetic plates are laminated on each other after causing the modifying member to diffuse and penetrate into the soft magnetic plate.

11. The method according to claim 1, wherein the plurality of soft magnetic plates are laminated on each other before causing the modifying member to diffuse and penetrate into the soft magnetic plate.

12. The method according to claim 1, wherein the soft magnetic plate contains one or more alloys or metals selected from the group consisting of soft magnetic alloys and soft magnetic transition metals.

13. The method according to claim 12,
wherein the soft magnetic alloy is a T-B soft magnetic alloy or a T-N soft magnetic alloy, and
wherein T is a transition metal element.

14. The method according to claim 13, wherein T is one or more elements selected from the group consisting of Fe, Co, and Ni.

15. The method according to claim 12, wherein the soft magnetic transition metal is one or more metals selected from the group consisting of Fe and Co.

16. The method according to claim 12, wherein the soft magnetic plate contains an Fe—B alloy.

17. The method according to claim 16, wherein the hard magnetic phase-containing part contains an $R_2Fe_{14}B$ phase.

18. A method of producing a motor core, comprising:
preparing a soft magnetic plate containing a transition metal element;
preparing a modifying member containing an alloy having a melting point lower than a melting point of the soft magnetic plate;
bringing the modifying member into contact with a part of a plate surface of the soft magnetic plate;
causing the modifying member to diffuse and penetrate into the soft magnetic plate from a contact surface between the soft magnetic plate and the modifying member, and forming a hard magnetic phase-containing part in a part of the soft magnetic plate; and
laminating a plurality of soft magnetic plates on each other after the modifying member is brought into contact with the part of the plate surface of the soft magnetic plate
wherein a composition of the modifying member that is brought into contact with at least one of the soft magnetic plates is different from a composition of the modifying member that is brought into contact with the other soft magnetic plates, and a composition of a hard magnetic phase in the hard magnetic phase-containing part in at least one of the soft magnetic plates is different from a composition of a hard magnetic phase in the hard magnetic phase-containing part in the other soft magnetic plates.

19. A method of producing a motor core, comprising:
preparing a soft magnetic plate containing a transition metal element;
preparing a modifying member containing an alloy having a melting point lower than a melting point of the soft magnetic plate;
bringing the modifying member into contact with a part of a plate surface of the soft magnetic plate;
causing the modifying member to diffuse and penetrate into the soft magnetic plate from a contact surface between the soft magnetic plate and the modifying member, and forming a hard magnetic phase-containing part in a part of the soft magnetic plate; and
laminating a plurality of soft magnetic plates on each other after the modifying member is brought into contact with the part of the plate surface of the soft magnetic plate
wherein a composition of at least one of the soft magnetic plates is different from a composition of the other soft magnetic plates, and a composition of a hard magnetic phase in the hard magnetic phase-containing part in at least one of the soft magnetic plates is different from a composition of a hard magnetic phase in the hard magnetic phase-containing part in the other soft magnetic plates.

20. A method of producing a motor core, comprising:
preparing a soft magnetic plate containing a transition metal element;
preparing a modifying member containing an alloy having a melting point lower than a melting point of the soft magnetic plate;
bringing the modifying member into contact with a part of a plate surface of the soft magnetic plate;
causing the modifying member to diffuse and penetrate into the soft magnetic plate from a contact surface between the soft magnetic plate and the modifying member, and forming a hard magnetic phase-containing part in a part of the soft magnetic plate; and
laminating a plurality of soft magnetic plates on each other after the modifying member is brought into contact with the part of the plate surface of the soft magnetic plate
wherein at least one additional soft magnetic plate is additionally laminated without coming into contact with the modifying member.

21. A method of producing a motor core, comprising:
preparing a soft magnetic plate containing a transition metal element;
preparing a modifying member containing an alloy having a melting point lower than a melting point of the soft magnetic plate;
bringing the modifying member into contact with a part of a plate surface of the soft magnetic plate;
causing the modifying member to diffuse and penetrate into the soft magnetic plate from a contact surface between the soft magnetic plate and the modifying member, and forming a hard magnetic phase-containing part in a part of the soft magnetic plate; and laminating a plurality of soft magnetic plates on each other after the modifying member is brought into contact with the part of the plate surface of the soft magnetic plate;

wherein the alloy is an R-M alloy, wherein R is a rare earth element, and M is an element that lowers a melting point of the R-M alloy to below the melting point of the soft magnetic plate;

wherein the modifying member is heated to a temperature that is equal to or higher than the melting point of the R-M alloy and lower than the melting point of the soft magnetic plate, and the modifying member diffuses and penetrates into the soft magnetic plate; and wherein a heating wire is brought into contact with the modifying member, a current flows through the heating wire, the modifying member is heated to a temperature that is equal to or higher than the melting point of the R-M alloy and lower than the melting point of the soft magnetic plate, and the modifying member diffuses and penetrates into the soft magnetic plate.

* * * * *